United States Patent
Trisnadi et al.

(10) Patent No.: US 7,286,764 B1
(45) Date of Patent: Oct. 23, 2007

(54) RECONFIGURABLE MODULATOR-BASED OPTICAL ADD-AND-DROP MULTIPLEXER

(75) Inventors: Jahja I. Trisnadi, Cupertino, CA (US); Clinton B. Carlisle, Palo Alto, CA (US)

(73) Assignee: Silicon Light Machines Corporation, San Jose, CA (US)

( * ) Notice: Subject to any disclaimer, the term of this patent is extended or adjusted under 35 U.S.C. 154(b) by 716 days.

(21) Appl. No.: 10/357,620

(22) Filed: Feb. 3, 2003

(51) Int. Cl.
*H04J 14/02* (2006.01)
*G02B 6/124* (2006.01)
*G02B 6/34* (2006.01)
*G02B 27/44* (2006.01)
*G02B 5/18* (2006.01)

(52) U.S. Cl. .......................... 398/84; 398/79; 398/82; 398/83; 398/84; 398/87; 398/68; 385/24; 385/37; 385/10; 359/572; 359/223; 359/290; 359/292; 359/298

(58) Field of Classification Search ............... 398/50, 398/87, 84; 369/103; 385/10; 359/558, 359/572
See application file for complete search history.

(56) References Cited

U.S. PATENT DOCUMENTS

| | | | |
|---|---|---|---|
| 1,525,550 A | 2/1925 | Jenkins | |
| 1,548,262 A | 8/1925 | Freedman | |
| RE16,767 E | 10/1927 | Jenkins | |
| 1,814,701 A | 7/1931 | Ives | |
| 2,415,226 A | 2/1947 | Sziklai | 178/5.4 |
| 2,783,406 A | 2/1957 | Vanderhooft | 313/70 |
| 2,920,529 A | 1/1960 | Blythe | 88/73 |
| 2,991,690 A | 7/1961 | Grey et al. | 88/16.6 |
| RE25,169 E | 5/1962 | Glenn | |
| 3,256,465 A | 6/1966 | Weissenstern et al. | 317/101 |
| 3,388,301 A | 6/1968 | James | 317/234 |
| 3,443,871 A | 5/1969 | Chitayat | 356/106 |

(Continued)

FOREIGN PATENT DOCUMENTS

EP     0 089 044 A2     9/1983

(Continued)

OTHER PUBLICATIONS

R. Apte, "Grating Light Valves for High Resolution Displays", Solid State Sensors and Actuators Workshop, Ph D. Dissertation, Stanford University (Jun. 1994).

(Continued)

*Primary Examiner*—Jason Chan
*Assistant Examiner*—Wai Lun Leung
(74) *Attorney, Agent, or Firm*—Okamoto & Benedicto LLP

(57) ABSTRACT

An optical add and drop multiplexer system comprising a first module for providing a first signal; a second module for providing a second signal; and a modulator for receiving a channel of the first signal at a first location, the first location configured to actuate between a first configuration and a second configuration, wherein the modulator directs the channel of the first signal as an output signal when the first location is in the first configuration. The modulator may direct the channel of the first signal as a dropped signal when the first location is in the second configuration. The modulator may also receive a channel of the second signal from the second module at a second location configured to independently actuate between the first configuration and the second configuration.

9 Claims, 6 Drawing Sheets

U.S. PATENT DOCUMENTS

| | | | |
|---|---|---|---|
| 3,553,364 A | 1/1971 | Lee | 178/7.3 |
| 3,576,394 A | 4/1971 | Lee | 178/7.3 |
| 3,600,798 A | 8/1971 | Lee | 29/592 |
| 3,656,837 A | 4/1972 | Sandbank | 350/161 |
| 3,657,610 A | 4/1972 | Yamamoto et al. | 317/243 |
| 3,693,239 A | 9/1972 | Dix | 29/470 |
| 3,743,507 A | 7/1973 | Ih et al. | 96/81 |
| 3,752,563 A | 8/1973 | Torok et al. | 350/151 |
| 3,781,465 A | 12/1973 | Ernstoff et al. | 178/5.4 BD |
| 3,783,184 A | 1/1974 | Ernstoff et al. | 178/5.4 BD |
| 3,792,916 A | 2/1974 | Sarna | 350/163 |
| 3,802,769 A | 4/1974 | Rotz et al. | 352/43 |
| 3,811,186 A | 5/1974 | Larnerd et al. | 29/626 |
| 3,861,784 A | 1/1975 | Torok | 350/162 R |
| 3,862,360 A | 1/1975 | Dill et al. | 178/7.3 D |
| 3,871,014 A | 3/1975 | King et al. | 357/67 |
| 3,886,310 A | 5/1975 | Guldberg et al. | 178/7.5 D |
| 3,896,338 A | 7/1975 | Nathanson et al. | 315/373 |
| 3,915,548 A | 10/1975 | Opittek | 350/3.5 |
| 3,935,499 A | 1/1976 | Oess | 313/413 |
| 3,935,500 A | 1/1976 | Oess et al. | 313/495 |
| 3,938,881 A | 2/1976 | Biegelsen et al. | 350/161 |
| 3,941,456 A | 3/1976 | Schilz et al. | 350/161 |
| 3,942,245 A | 3/1976 | Jackson et al. | 29/591 |
| 3,943,281 A | 3/1976 | Keller et al. | 178/7.5 D |
| 3,947,105 A | 3/1976 | Smith | 353/121 |
| 3,969,611 A | 7/1976 | Fonteneau | 219/502 |
| 3,980,476 A | 9/1976 | Wysocki | 96/1.1 |
| 3,991,416 A | 11/1976 | Byles et al. | 340/324 R |
| 4,001,663 A | 1/1977 | Bray | 321/2 |
| 4,004,849 A | 1/1977 | Shattuck | 350/160 R |
| 4,006,968 A | 2/1977 | Ernstoff et al. | 350/160 LC |
| 4,009,939 A | 3/1977 | Okano | 350/162 SF |
| 4,011,009 A | 3/1977 | Lama et al. | 350/162 R |
| 4,012,116 A | 3/1977 | Yevick | 350/132 |
| 4,012,835 A | 3/1977 | Wallick | 29/591 |
| 4,017,158 A | 4/1977 | Booth | 350/162 SF |
| 4,020,381 A | 4/1977 | Oess et al. | 313/302 |
| 4,021,766 A | 5/1977 | Aine | 338/2 |
| 4,034,211 A | 7/1977 | Horst et al. | 235/61.12 N |
| 4,034,399 A | 7/1977 | Drukier et al. | 357/68 |
| 4,035,068 A | 7/1977 | Rawson | 353/122 |
| 4,067,129 A | 1/1978 | Abramson et al. | 40/563 |
| 4,084,437 A | 4/1978 | Finnegan | 73/361 |
| 4,090,219 A | 5/1978 | Ernstoff et al. | 358/59 |
| 4,093,346 A | 6/1978 | Nishino et al. | 350/162 SF |
| 4,093,921 A | 6/1978 | Buss | 325/459 |
| 4,093,922 A | 6/1978 | Buss | 325/459 |
| 4,100,579 A | 7/1978 | Ernstoff | 358/230 |
| 4,103,273 A | 7/1978 | Keller | 338/2 |
| 4,126,380 A | 11/1978 | Borm | 350/266 |
| 4,127,322 A | 11/1978 | Jacobson et al. | 353/31 |
| 4,135,502 A | 1/1979 | Peck | 128/76.5 |
| 4,139,257 A | 2/1979 | Matsumoto | 350/6.1 |
| 4,143,943 A | 3/1979 | Rawson | 350/120 |
| 4,163,570 A | 8/1979 | Greenaway | 283/8 A |
| 4,184,700 A | 1/1980 | Greenaway | 283/6 |
| 4,185,891 A | 1/1980 | Kaestner | 350/167 |
| 4,190,855 A | 2/1980 | Inoue | 357/80 |
| 4,195,915 A | 4/1980 | Lichty et al. | 350/345 |
| 4,205,428 A | 6/1980 | Ernstoff et al. | 29/592 R |
| 4,211,918 A | 7/1980 | Nyfeler et al. | 235/454 |
| 4,223,050 A | 9/1980 | Nyfeler et al. | 427/163 |
| 4,225,913 A | 9/1980 | Bray | 363/97 |
| 4,249,796 A | 2/1981 | Sincerbox et al. | 350/370 |
| 4,250,217 A | 2/1981 | Greenaway | 428/161 |
| 4,250,393 A | 2/1981 | Greenaway | 250/566 |
| 4,256,787 A | 3/1981 | Shaver et al. | 428/1 |
| 4,257,016 A | 3/1981 | Kramer, Jr. et al. | 322/7.51 |
| 4,290,672 A | 9/1981 | Whitefield | 350/358 |
| 4,295,145 A | 10/1981 | Latta | 346/108 |
| 4,311,999 A | 1/1982 | Upton et al. | 340/755 |
| 4,327,411 A | 4/1982 | Turner | 364/900 |
| 4,327,966 A | 5/1982 | Bloom | 350/162 R |
| 4,331,972 A | 5/1982 | Rajchman | 358/60 |
| 4,336,982 A | 6/1982 | Rector, Jr. | 350/358 |
| 4,338,660 A | 7/1982 | Kelley et al. | 364/200 |
| 4,343,535 A | 8/1982 | Bleha, Jr. | 350/342 |
| 4,346,965 A | 8/1982 | Sprague et al. | 350/358 |
| 4,348,079 A | 9/1982 | Johnson | 250/358 |
| 4,355,463 A | 10/1982 | Burns | 29/827 |
| 4,361,384 A | 11/1982 | Bosserman | 350/174 |
| 4,369,524 A | 1/1983 | Rawson et al. | 455/606 |
| 4,374,397 A | 2/1983 | Mir | 358/75 |
| 4,389,096 A | 6/1983 | Hori et al. | 350/339 R |
| 4,391,490 A | 7/1983 | Hartke | 350/356 |
| 4,396,246 A | 8/1983 | Holman | 350/96.14 |
| 4,398,798 A | 8/1983 | Krawczak et al. | 350/162.24 |
| 4,400,740 A | 8/1983 | Traino et al. | 358/293 |
| 4,408,884 A | 10/1983 | Kleinknecht et al. | 356/355 |
| 4,414,583 A | 11/1983 | Hooker, III | 358/300 |
| 4,417,386 A | 11/1983 | Exner | 29/590 |
| 4,418,397 A | 11/1983 | Brantingham et al. | 364/900 |
| 4,420,717 A | 12/1983 | Wallace et al. | 318/696 |
| 4,422,099 A | 12/1983 | Wolfe | 358/293 |
| 4,426,768 A | 1/1984 | Black et al. | 29/583 |
| 4,430,584 A | 2/1984 | Someshwar et al. | 307/465 |
| 4,435,041 A | 3/1984 | Torok et al. | 350/162.24 |
| 4,440,839 A | 4/1984 | Mottier | 430/2 |
| 4,443,819 A | 4/1984 | Funada et al. | 358/236 |
| 4,443,845 A | 4/1984 | Hamilton et al. | 364/200 |
| 4,447,881 A | 5/1984 | Brantingham et al. | 364/488 |
| 4,454,591 A | 6/1984 | Lou | 364/900 |
| 4,456,338 A | 6/1984 | Gelbart | 350/358 |
| 4,460,907 A | 7/1984 | Nelson | 346/153.1 |
| 4,462,046 A | 7/1984 | Spight | 358/101 |
| 4,467,342 A | 8/1984 | Tower | 357/30 |
| 4,468,725 A | 8/1984 | Venturini | 363/160 |
| 4,483,596 A | 11/1984 | Marshall | 350/385 |
| 4,484,188 A | 11/1984 | Ott | 340/728 |
| 4,487,677 A | 12/1984 | Murphy | 204/247 |
| 4,492,435 A | 1/1985 | Banton et al. | 350/360 |
| 4,503,494 A | 3/1985 | Hamilton et al. | 364/200 |
| 4,511,220 A | 4/1985 | Scully | 350/403 |
| 4,538,883 A | 9/1985 | Sprague et al. | 350/356 |
| 4,545,610 A | 10/1985 | Lakritz et al. | 29/589 |
| 4,556,378 A | 12/1985 | Nyfeler et al. | 425/143 |
| 4,558,171 A | 12/1985 | Gantley et al. | 174/52 FP |
| 4,561,044 A | 12/1985 | Ogura et al. | 362/84 |
| 4,566,935 A | 1/1986 | Hornbeck | 156/626 |
| 4,567,585 A | 1/1986 | Gelbart | 369/97 |
| 4,571,041 A | 2/1986 | Gaudyn | 353/10 |
| 4,571,603 A | 2/1986 | Hornbeck et al. | 346/160 |
| 4,577,932 A | 3/1986 | Gelbart | 350/358 |
| 4,577,933 A | 3/1986 | Yip et al. | 350/358 |
| 4,588,957 A | 5/1986 | Balant et al. | 330/4.3 |
| 4,590,548 A | 5/1986 | Maytum | 363/161 |
| 4,594,501 A | 6/1986 | Culley et al. | 219/492 |
| 4,596,992 A | 6/1986 | Hornbeck | 346/76 PH |
| 4,615,595 A | 10/1986 | Hornbeck | 353/122 |
| 4,623,219 A | 11/1986 | Trias | 350/351 |
| 4,636,039 A | 1/1987 | Turner | 350/356 |
| 4,636,866 A | 1/1987 | Hattori | 358/236 |
| 4,641,193 A | 2/1987 | Glenn | 358/233 |
| 4,645,881 A | 2/1987 | LeToumelin et al. | 379/252 |
| 4,646,158 A | 2/1987 | Ohno et al. | 358/236 |
| 4,649,085 A | 3/1987 | Landram | 428/620 |
| 4,649,432 A | 3/1987 | Watanabe | 358/241 |
| 4,652,932 A | 3/1987 | Miyajima et al. | 358/236 |
| 4,655,539 A | 4/1987 | Caulfield et al. | 350/3.6 |
| 4,660,938 A | 4/1987 | Kazan | 350/355 |
| 4,661,828 A | 4/1987 | Miller, Jr. et al. | 346/108 |
| 4,662,746 A | 5/1987 | Hornbeck | 350/269 |
| 4,663,670 A | 5/1987 | Ito et al. | 358/245 |

| Patent No. | Date | Inventor | Class |
|---|---|---|---|
| 4,687,326 A | 8/1987 | Corby, Jr. | 356/5 |
| 4,698,602 A | 10/1987 | Armitage | 332/7.51 |
| 4,700,276 A | 10/1987 | Freyman et al. | 361/403 |
| 4,707,064 A | 11/1987 | Dobrowolski et al. | 350/96.19 |
| 4,709,995 A | 12/1987 | Kuribayashi et al. | 350/350 |
| 4,710,732 A | 12/1987 | Hornbeck | 332/7.51 |
| 4,711,526 A | 12/1987 | Hennings et al. | 350/170 |
| 4,714,326 A | 12/1987 | Usui et al. | 350/485 |
| 4,717,066 A | 1/1988 | Goldenberg et al. | 228/179 |
| 4,719,507 A | 1/1988 | Bos | 358/92 |
| 4,721,629 A | 1/1988 | Sakai et al. | 427/35 |
| 4,722,593 A | 2/1988 | Shimazaki | 350/336 |
| 4,724,467 A | 2/1988 | Yip et al. | 355/71 |
| 4,728,185 A | 3/1988 | Thomas | 353/122 |
| 4,743,091 A | 5/1988 | Gelbart | 350/252 |
| 4,744,633 A | 5/1988 | Sheiman | 350/132 |
| 4,747,671 A | 5/1988 | Takahashi et al. | 350/336 |
| 4,751,509 A | 6/1988 | Kubota et al. | 340/784 |
| 4,761,253 A | 8/1988 | Antes | 264/1.3 |
| 4,763,975 A | 8/1988 | Scifres et al. | 350/96.15 |
| 4,765,865 A | 8/1988 | Gealer et al. | 156/647 |
| 4,772,094 A | 9/1988 | Sheiman | 350/133 |
| 4,797,694 A | 1/1989 | Agostinelli et al. | 346/160 |
| 4,797,918 A | 1/1989 | Lee et al. | 380/20 |
| 4,801,194 A | 1/1989 | Agostinelli et al. | 350/356 |
| 4,803,560 A | 2/1989 | Matsunaga et al. | 359/236 |
| 4,804,641 A | 2/1989 | Arlt et al. | 437/227 |
| 4,807,021 A | 2/1989 | Okumura | 357/75 |
| 4,807,965 A | 2/1989 | Garakani | 350/131 |
| 4,809,078 A | 2/1989 | Yabe et al. | 358/236 |
| 4,811,082 A | 3/1989 | Jacobs et al. | 357/80 |
| 4,811,210 A | 3/1989 | McAulay | 364/200 |
| 4,814,759 A | 3/1989 | Gombrich et al. | 340/771 |
| 4,817,850 A | 4/1989 | Wiener-Avnear et al. | 228/119 |
| 4,824,200 A | 4/1989 | Isono et al. | 350/96.16 |
| 4,827,391 A | 5/1989 | Sills | 363/41 |
| 4,829,365 A | 5/1989 | Eichenlaub | 358/3 |
| 4,836,649 A | 6/1989 | Ledebuhr et al. | 350/331 R |
| 4,856,863 A | 8/1989 | Sampsell et al. | 350/96.16 |
| 4,856,869 A | 8/1989 | Sakata et al. | 350/162.18 |
| 4,859,012 A | 8/1989 | Cohn | 350/96.24 |
| 4,859,060 A | 8/1989 | Katagiri et al. | 356/352 |
| 4,866,488 A | 9/1989 | Frensley | 357/4 |
| 4,882,683 A | 11/1989 | Rupp et al. | 364/521 |
| 4,893,509 A | 1/1990 | MacIver et al. | 73/517 AV |
| 4,896,325 A | 1/1990 | Coldren | 372/20 |
| 4,896,948 A | 1/1990 | Dono et al. | 350/355 |
| 4,897,708 A | 1/1990 | Clements | 357/65 |
| 4,902,083 A | 2/1990 | Wells | 350/6.6 |
| 4,915,463 A | 4/1990 | Barbee, Jr. | 350/1.1 |
| 4,915,479 A | 4/1990 | Clarke | 350/345 |
| 4,924,413 A | 5/1990 | Suwannukul | 364/521 |
| 4,926,241 A | 5/1990 | Carey | 357/75 |
| 4,930,043 A | 5/1990 | Wiegand | 361/283 |
| 4,934,773 A | 6/1990 | Becker | 350/6.6 |
| 4,940,309 A | 7/1990 | Baum | 350/171 |
| 4,943,815 A | 7/1990 | Aldrich et al. | 346/108 |
| 4,945,773 A | 8/1990 | Sickafus | 73/862.59 |
| 4,949,148 A | 8/1990 | Bartelink | 357/74 |
| 4,950,890 A | 8/1990 | Gelbart | 250/237 G |
| 4,952,925 A | 8/1990 | Haastert | 340/784 |
| 4,954,789 A | 9/1990 | Sampsell | 330/4.3 |
| 4,956,619 A | 9/1990 | Hornbeck | 330/4.3 |
| 4,961,633 A | 10/1990 | Ibrahim et al. | 350/392 |
| 4,963,012 A | 10/1990 | Tracy et al. | 350/641 |
| 4,970,575 A | 11/1990 | Soga et al. | 357/72 |
| 4,978,202 A | 12/1990 | Yang | 350/331 R |
| 4,982,184 A | 1/1991 | Kirkwood | 340/783 |
| 4,982,265 A | 1/1991 | Watanabe et al. | 357/75 |
| 4,984,824 A | 1/1991 | Antes et al. | 283/91 |
| 4,999,308 A | 3/1991 | Nishiura et al. | 437/4 |
| 5,003,300 A | 3/1991 | Wells | 340/705 |
| 5,009,473 A | 4/1991 | Hunter et al. | 350/6.6 |
| 5,013,141 A | 5/1991 | Sakata | 350/348 |
| 5,018,256 A | 5/1991 | Hornbeck | 29/25.01 |
| 5,022,750 A | 6/1991 | Flasck | 353/31 |
| 5,023,905 A | 6/1991 | Wells et al. | 379/96 |
| 5,024,494 A | 6/1991 | Williams et al. | 350/3.6 |
| 5,028,939 A | 7/1991 | Hornbeck et al. | 346/160 |
| 5,035,473 A | 7/1991 | Kuwayama et al. | 350/3.7 |
| 5,037,173 A | 8/1991 | Sampsell et al. | 385/17 |
| 5,039,628 A | 8/1991 | Carey | 437/183 |
| 5,040,052 A | 8/1991 | McDavid | 357/80 |
| 5,041,395 A | 8/1991 | Steffen | 437/206 |
| 5,041,851 A | 8/1991 | Nelson | 346/160 |
| 5,043,917 A | 8/1991 | Okamoto | 364/518 |
| 5,048,077 A | 9/1991 | Wells et al. | 379/96 |
| 5,049,901 A | 9/1991 | Gelbart | 346/108 |
| 5,058,992 A | 10/1991 | Takahashi | 359/567 |
| 5,060,058 A | 10/1991 | Goldenberg et al. | 358/60 |
| 5,061,049 A | 10/1991 | Hornbeck | 359/224 |
| 5,066,614 A | 11/1991 | Dunaway et al. | 437/209 |
| 5,068,205 A | 11/1991 | Baxter et al. | 437/205 |
| 5,072,239 A | 12/1991 | Mitcham et al. | 346/108 |
| 5,072,418 A | 12/1991 | Boutaud et al. | 364/715.06 |
| 5,074,947 A | 12/1991 | Estes et al. | 156/307.3 |
| 5,075,940 A | 12/1991 | Kuriyama et al. | 29/25.03 |
| 5,079,544 A | 1/1992 | DeMond et al. | 340/701 |
| 5,081,617 A | 1/1992 | Gelbart | 369/112 |
| 5,083,857 A | 1/1992 | Hornbeck | 359/291 |
| 5,085,497 A | 2/1992 | Um et al. | 359/848 |
| 5,089,903 A | 2/1992 | Kuwayama et al. | 359/15 |
| 5,093,281 A | 3/1992 | Eshima | 437/217 |
| 5,096,279 A | 3/1992 | Hornbeck et al. | 359/230 |
| 5,099,353 A | 3/1992 | Hornbeck | 359/291 |
| 5,101,184 A | 3/1992 | Antes | 235/454 |
| 5,101,236 A | 3/1992 | Nelson et al. | 355/229 |
| 5,103,334 A | 4/1992 | Swanberg | 359/197 |
| 5,105,207 A | 4/1992 | Nelson | 346/160 |
| 5,105,299 A | 4/1992 | Anderson et al. | 359/223 |
| 5,105,369 A | 4/1992 | Nelson | 364/525 |
| 5,107,372 A | 4/1992 | Gelbart et al. | 359/824 |
| 5,112,436 A | 5/1992 | Bol | 156/643 |
| 5,113,272 A | 5/1992 | Reamey | 359/53 |
| 5,113,285 A | 5/1992 | Franklin et al. | 359/465 |
| 5,115,344 A | 5/1992 | Jaskie | 359/573 |
| 5,119,204 A | 6/1992 | Hashimoto et al. | 358/254 |
| 5,121,343 A | 6/1992 | Faris | 395/111 |
| 5,126,812 A | 6/1992 | Greiff | 357/25 |
| 5,126,826 A | 6/1992 | Kauchi et al. | 357/72 |
| 5,126,836 A | 6/1992 | Um | 358/60 |
| 5,128,660 A | 7/1992 | DeMond et al. | 340/707 |
| 5,129,716 A | 7/1992 | Holakovszky et al. | 351/50 |
| 5,132,723 A | 7/1992 | Gelbart | 355/40 |
| 5,132,812 A | 7/1992 | Takahashi et al. | 359/9 |
| 5,136,695 A | 8/1992 | Goldshlag et al. | 395/275 |
| 5,137,836 A | 8/1992 | Lam | 437/8 |
| 5,142,303 A | 8/1992 | Nelson | 346/108 |
| 5,142,405 A | 8/1992 | Hornbeck | 359/226 |
| 5,142,677 A | 8/1992 | Ehlig et al. | 395/650 |
| 5,144,472 A | 9/1992 | Sang, Jr. et al. | 359/254 |
| 5,147,815 A | 9/1992 | Casto | 437/51 |
| 5,148,157 A | 9/1992 | Florence | 340/783 |
| 5,148,506 A | 9/1992 | McDonald | 385/16 |
| 5,149,405 A | 9/1992 | Bruns et al. | 204/129.1 |
| 5,150,205 A | 9/1992 | Um et al. | 358/60 |
| 5,151,718 A | 9/1992 | Nelson | 346/160 |
| 5,151,724 A | 9/1992 | Kikinis | 357/17 |
| 5,151,763 A | 9/1992 | Marek et al. | 357/26 |
| 5,153,770 A | 10/1992 | Harris | 359/245 |
| 5,155,604 A | 10/1992 | Miekka et al. | 359/2 |
| 5,155,615 A | 10/1992 | Tagawa | 359/213 |
| 5,155,778 A | 10/1992 | Magel et al. | 385/18 |
| 5,155,812 A | 10/1992 | Ehlig et al. | 395/275 |
| 5,157,304 A | 10/1992 | Kane et al. | 313/495 |
| 5,159,485 A | 10/1992 | Nelson | 359/291 |

| | | | | | | | |
|---|---|---|---|---|---|---|---|
| 5,161,042 | A | 11/1992 | Hamada ................ 359/41 | 5,278,652 | A | 1/1994 | Urbanus et al. ............ 358/160 |
| 5,162,787 | A | 11/1992 | Thompson et al. ......... 340/794 | 5,278,925 | A | 1/1994 | Boysel et al. ................ 385/14 |
| 5,164,019 | A | 11/1992 | Sinton .................. 136/249 | 5,280,277 | A | 1/1994 | Hornbeck ................ 345/108 |
| 5,165,013 | A | 11/1992 | Faris .................... 395/104 | 5,281,887 | A | 1/1994 | Engle .................... 310/335 |
| 5,168,401 | A | 12/1992 | Endriz ................... 359/625 | 5,281,957 | A | 1/1994 | Schoolman ................ 345/8 |
| 5,168,406 | A | 12/1992 | Nelson ................... 359/855 | 5,285,105 | A | 2/1994 | Cain ....................... 257/672 |
| 5,170,156 | A | 12/1992 | DeMond et al. ........... 340/794 | 5,285,196 | A | 2/1994 | Gale, Jr. .................... 345/108 |
| 5,170,269 | A | 12/1992 | Lin et al. ................ 359/9 | 5,285,407 | A | 2/1994 | Gale et al. ............ 365/189.11 |
| 5,170,283 | A | 12/1992 | O'Brien et al. ............ 359/291 | 5,287,096 | A | 2/1994 | Thompson et al. ......... 345/147 |
| 5,172,161 | A | 12/1992 | Nelson ................... 355/200 | 5,287,215 | A | 2/1994 | Warde et al. .............. 359/293 |
| 5,172,262 | A | 12/1992 | Hornbeck ................ 359/223 | 5,289,172 | A | 2/1994 | Gale, Jr. et al. ............ 345/108 |
| 5,177,724 | A | 1/1993 | Gelbart .................. 369/44.16 | 5,291,317 | A | 3/1994 | Newswanger ............... 359/15 |
| 5,178,728 | A | 1/1993 | Boysel et al. .............. 156/656 | 5,291,473 | A | 3/1994 | Pauli ..................... 369/112 |
| 5,179,274 | A | 1/1993 | Sampsell ................ 250/208.2 | 5,293,511 | A | 3/1994 | Poradish et al. ............ 257/434 |
| 5,179,367 | A | 1/1993 | Shimizu ................. 340/700 | 5,296,408 | A | 3/1994 | Wilbarg et al. ............ 437/203 |
| 5,181,231 | A | 1/1993 | Parikh et al. ............. 377/26 | 5,296,891 | A | 3/1994 | Vogt et al. ................. 355/67 |
| 5,182,665 | A | 1/1993 | O'Callaghan et al. ....... 359/95 | 5,296,950 | A | 3/1994 | Lin et al. ................... 359/9 |
| 5,185,660 | A | 2/1993 | Um ..................... 358/60 | 5,298,460 | A | 3/1994 | Nishiguchi et al. ......... 437/183 |
| 5,188,280 | A | 2/1993 | Nakao et al. ............. 228/123 | 5,299,037 | A | 3/1994 | Sakata ................... 359/41 |
| 5,189,404 | A | 2/1993 | Masimo et al. ........... 340/720 | 5,299,289 | A | 3/1994 | Omae et al. .............. 359/95 |
| 5,189,505 | A | 2/1993 | Bartelink ................ 257/419 | 5,300,813 | A | 4/1994 | Joshi et al. ............... 257/752 |
| 5,191,405 | A | 3/1993 | Tomita et al. ............. 257/777 | 5,301,062 | A | 4/1994 | Takahashi et al. ........... 359/567 |
| 5,192,864 | A | 3/1993 | McEwen et al. ............ 250/234 | 5,303,043 | A | 4/1994 | Glenn ..................... 348/40 |
| 5,192,946 | A | 3/1993 | Thompson et al. ......... 340/794 | 5,303,055 | A | 4/1994 | Hendrix et al. ............ 348/761 |
| 5,198,895 | A | 3/1993 | Vick ..................... 358/103 | 5,307,056 | A | 4/1994 | Urbanus .................. 340/189 |
| D334,557 | S | 4/1993 | Hunter et al. ............ D14/114 | 5,307,185 | A | 4/1994 | Jones et al. ............... 359/41 |
| D334,742 | S | 4/1993 | Hunter et al. ............ D14/113 | 5,310,624 | A | 5/1994 | Ehrlich .................. 430/322 |
| 5,202,785 | A | 4/1993 | Nelson ................... 359/214 | 5,311,349 | A | 5/1994 | Anderson et al. ........... 359/223 |
| 5,206,629 | A | 4/1993 | DeMond et al. ........... 340/719 | 5,311,360 | A * | 5/1994 | Bloom et al. ................ 359/572 |
| 5,208,818 | A | 5/1993 | Gelbart et al. ............ 372/30 | 5,312,513 | A | 5/1994 | Florence et al. ........... 156/643 |
| 5,208,891 | A | 5/1993 | Prysner .................. 385/116 | 5,313,479 | A | 5/1994 | Florence .................. 372/26 |
| 5,210,637 | A | 5/1993 | Puzey ................... 359/263 | 5,313,648 | A | 5/1994 | Ehlig et al. ............... 395/800 |
| 5,212,115 | A | 5/1993 | Cho et al. ................. 437/208 | 5,313,835 | A | 5/1994 | Dunn ..................... 73/505 |
| 5,212,555 | A | 5/1993 | Stoltz ................... 358/206 | 5,315,418 | A | 5/1994 | Sprague et al. ............ 359/41 |
| 5,212,582 | A | 5/1993 | Nelson ................... 359/224 | 5,315,423 | A | 5/1994 | Hong .................... 359/124 |
| 5,214,308 | A | 5/1993 | Nishiguchi et al. ......... 257/692 | 5,319,214 | A | 6/1994 | Gregory et al. ........... 250/504 R |
| 5,214,419 | A | 5/1993 | DeMond et al. ........... 340/794 | 5,319,668 | A | 6/1994 | Luecke .................. 372/107 |
| 5,214,420 | A | 5/1993 | Thompson et al. ......... 340/795 | 5,319,789 | A | 6/1994 | Ehlig et al. .............. 395/800 |
| 5,216,537 | A | 6/1993 | Hornbeck ................ 359/291 | 5,319,792 | A | 6/1994 | Ehlig et al. .............. 395/800 |
| 5,216,544 | A | 6/1993 | Horikawa et al. .......... 359/622 | 5,321,416 | A | 6/1994 | Bassett et al. .............. 345/8 |
| 5,219,794 | A | 6/1993 | Satoh et al. .............. 437/209 | 5,323,002 | A | 6/1994 | Sampsell et al. .......... 250/252.1 |
| 5,220,200 | A | 6/1993 | Blanton .................. 257/778 | 5,323,051 | A | 6/1994 | Adams et al. ............. 257/417 |
| 5,221,400 | A | 6/1993 | Staller et al. ............. 156/292 | 5,325,116 | A | 6/1994 | Sampsell ................. 346/108 |
| 5,221,982 | A | 6/1993 | Faris .................... 359/93 | 5,327,286 | A | 7/1994 | Sampsell et al. ........... 359/561 |
| 5,224,088 | A | 6/1993 | Atiya .................... 369/97 | 5,329,289 | A | 7/1994 | Sakamoto et al. .......... 345/126 |
| D337,320 | S | 7/1993 | Hunter et al. ............ D14/113 | 5,330,301 | A | 7/1994 | Brancher ................. 414/417 |
| 5,226,099 | A | 7/1993 | Mignardi et al. ........... 385/19 | 5,330,878 | A | 7/1994 | Nelson ................... 430/311 |
| 5,230,005 | A | 7/1993 | Rubino et al. ............ 372/20 | 5,331,454 | A | 7/1994 | Hornbeck ................ 359/224 |
| 5,231,363 | A | 7/1993 | Sano et al. ............... 332/109 | 5,334,991 | A | 8/1994 | Wells et al. ............... 345/8 |
| 5,231,388 | A | 7/1993 | Stoltz ................... 340/783 | 5,339,116 | A | 8/1994 | Urbanus et al. ............ 348/716 |
| 5,231,432 | A | 7/1993 | Glenn ................... 355/31 | 5,339,177 | A | 8/1994 | Jenkins et al. ............ 359/35 |
| 5,233,456 | A | 8/1993 | Nelson ................... 359/214 | 5,340,772 | A | 8/1994 | Rosotker ................. 437/226 |
| 5,233,460 | A | 8/1993 | Partlo et al. .............. 359/247 | 5,345,521 | A | 9/1994 | McDonald et al. ........... 385/19 |
| 5,233,874 | A | 8/1993 | Putty et al. ............... 73/517 AV | 5,347,321 | A | 9/1994 | Gove .................... 348/663 |
| 5,237,340 | A | 8/1993 | Nelson ................... 346/108 | 5,347,378 | A | 9/1994 | Handschy et al. .......... 359/53 |
| 5,237,435 | A | 8/1993 | Kurematsu et al. ......... 359/41 | 5,347,433 | A | 9/1994 | Sedlmayr ................ 362/32 |
| 5,239,448 | A | 8/1993 | Perkins et al. ............. 361/764 | 5,348,619 | A | 9/1994 | Bohannon et al. .......... 156/664 |
| 5,239,806 | A | 8/1993 | Maslakow ................ 53/432 | 5,349,687 | A | 9/1994 | Ehlig et al. .............. 395/800 |
| 5,240,818 | A | 8/1993 | Mignardi et al. ........... 430/321 | 5,351,052 | A | 9/1994 | D'Hont et al. ............. 342/42 |
| 5,245,686 | A | 9/1993 | Faris et al. ............... 385/120 | 5,352,926 | A | 10/1994 | Andrews ................. 257/717 |
| 5,247,180 | A | 9/1993 | Mitcham et al. ........... 250/492.1 | 5,354,416 | A | 10/1994 | Okudaira et al. ........... 156/643 |
| 5,247,593 | A | 9/1993 | Lin et al. ................. 385/17 | 5,357,369 | A | 10/1994 | Pilling et al. .............. 359/462 |
| 5,249,245 | A | 9/1993 | Lebby et al. .............. 385/89 | 5,357,803 | A | 10/1994 | Lane .................... 73/517 B |
| 5,251,057 | A | 10/1993 | Guerin et al. ............. 359/249 | 5,359,349 | A | 10/1994 | Jambor et al. ............. 345/168 |
| 5,251,058 | A | 10/1993 | MacArthur ............... 359/249 | 5,359,451 | A | 10/1994 | Gelbart et al. ............ 359/285 |
| 5,254,980 | A | 10/1993 | Hendrix et al. ............ 345/84 | 5,361,131 | A | 11/1994 | Tekemori et al. ........... 356/355 |
| 5,255,100 | A | 10/1993 | Urbanus .................. 358/231 | 5,363,220 | A | 11/1994 | Kuwayama et al. .......... 359/3 |
| 5,256,869 | A | 10/1993 | Lin et al. ................. 250/201.9 | 5,365,283 | A | 11/1994 | Doherty et al. ............ 348/743 |
| 5,258,325 | A | 11/1993 | Spitzer et al. ............. 437/86 | 5,367,585 | A | 11/1994 | Ghezzo et al. ............. 385/23 |
| 5,260,718 | A | 11/1993 | Rommelmann et al. | 346/107 R | 5,371,543 | A | 12/1994 | Anderson ................ 348/270 |
| 5,260,798 | A | 11/1993 | Um et al. ................. 358/233 | 5,371,618 | A | 12/1994 | Tai et al. .................. 359/53 |
| 5,262,000 | A | 11/1993 | Welbourn et al. ........... 156/643 | 5,382,961 | A | 1/1995 | Gale, Jr. ................... 345/108 |
| 5,272,473 | A | 12/1993 | Thompson et al. ........... 345/7 | 5,387,924 | A | 2/1995 | Gale, Jr. et al. ............ 345/108 |

| Patent | Date | Inventor | Class |
|---|---|---|---|
| 5,389,182 A | 2/1995 | Mignardi | 156/344 |
| 5,391,881 A | 2/1995 | Jeuch et al. | 250/370.09 |
| 5,392,140 A | 2/1995 | Ezra et al. | 359/41 |
| 5,392,151 A | 2/1995 | Nelson | 359/223 |
| 5,394,303 A | 2/1995 | Yamaji | 361/749 |
| 5,398,071 A | 3/1995 | Gove et al. | 348/558 |
| 5,399,898 A | 3/1995 | Rostoker | 257/499 |
| 5,404,365 A | 4/1995 | Hiiro | 372/27 |
| 5,404,485 A | 4/1995 | Ban | 395/425 |
| 5,408,123 A | 4/1995 | Murai | 257/531 |
| 5,410,315 A | 4/1995 | Huber | 342/42 |
| 5,411,769 A | 5/1995 | Hornbeck | 427/534 |
| 5,412,186 A | 5/1995 | Gale | 219/679 |
| 5,412,501 A | 5/1995 | Fisli | 359/286 |
| 5,418,584 A | 5/1995 | Larson | 353/122 |
| 5,420,655 A | 5/1995 | Shimizu | 353/33 |
| 5,420,722 A | 5/1995 | Bielak | 359/708 |
| 5,426,072 A | 6/1995 | Finnila | 437/208 |
| 5,427,975 A | 6/1995 | Sparks et al. | 437/79 |
| 5,430,524 A | 7/1995 | Nelson | 355/200 |
| 5,435,876 A | 7/1995 | Alfaro et al. | 156/247 |
| 5,438,477 A | 8/1995 | Pasch | 361/689 |
| 5,439,731 A | 8/1995 | Li et al. | 428/209 |
| 5,442,411 A | 8/1995 | Urbanus et al. | 348/771 |
| 5,442,414 A | 8/1995 | Janssen et al. | 353/98 |
| 5,444,566 A | 8/1995 | Gale et al. | 359/291 |
| 5,445,559 A | 8/1995 | Gale et al. | 451/388 |
| 5,446,479 A | 8/1995 | Thompson et al. | 345/139 |
| 5,447,600 A | 9/1995 | Webb | 216/2 |
| 5,448,314 A | 9/1995 | Heimbuch et al. | 348/743 |
| 5,448,546 A | 9/1995 | Pauli | 369/112 |
| 5,450,088 A | 9/1995 | Meier et al. | 342/51 |
| 5,450,219 A | 9/1995 | Gold et al. | 359/40 |
| 5,451,103 A | 9/1995 | Hatanaka et al. | 353/31 |
| 5,452,024 A | 9/1995 | Sampsell | 348/755 |
| 5,452,138 A | 9/1995 | Mignardi et al. | 359/855 |
| 5,453,747 A | 9/1995 | D'Hont et al. | 342/42 |
| 5,453,778 A | 9/1995 | Venkateswar et al. | 347/239 |
| 5,453,803 A | 9/1995 | Shapiro et al. | 353/119 |
| 5,454,160 A | 10/1995 | Nickel | 29/840 |
| 5,454,906 A | 10/1995 | Baker et al. | 216/66 |
| 5,455,445 A | 10/1995 | Kurtz et al. | 257/419 |
| 5,455,455 A | 10/1995 | Badehi | 257/690 |
| 5,455,602 A | 10/1995 | Tew | 347/239 |
| 5,457,493 A | 10/1995 | Leddy et al. | 348/164 |
| 5,457,566 A | 10/1995 | Sampsell et al. | 359/292 |
| 5,457,567 A | 10/1995 | Shinohara | 359/305 |
| 5,458,716 A | 10/1995 | Alfaro et al. | 156/245 |
| 5,459,492 A | 10/1995 | Venkateswar | 347/253 |
| 5,459,528 A | 10/1995 | Pettitt | 348/568 |
| 5,459,592 A | 10/1995 | Shibatani et al. | 359/40 |
| 5,459,610 A | 10/1995 | Bloom et al. | 359/572 |
| 5,461,197 A | 10/1995 | Hiruta et al. | 174/52.4 |
| 5,461,410 A | 10/1995 | Venkateswar et al. | 347/240 |
| 5,461,411 A | 10/1995 | Florence et al. | 347/240 |
| 5,461,547 A | 10/1995 | Ciupke et al. | 362/31 |
| 5,463,347 A | 10/1995 | Jones et al. | 330/253 |
| 5,463,497 A | 10/1995 | Muraki et al. | 359/618 |
| 5,465,175 A | 11/1995 | Woodgate et al. | 359/463 |
| 5,467,106 A | 11/1995 | Salomon | 345/87 |
| 5,467,138 A | 11/1995 | Gove | 348/452 |
| 5,467,146 A | 11/1995 | Huang et al. | 348/743 |
| 5,469,302 A | 11/1995 | Lim | 359/846 |
| 5,471,341 A | 11/1995 | Warde et al. | 359/293 |
| 5,473,512 A | 12/1995 | Degani et al. | 361/760 |
| 5,475,236 A | 12/1995 | Yoshizaki | 257/48 |
| 5,480,839 A | 1/1996 | Ezawa et al. | 437/209 |
| 5,481,118 A | 1/1996 | Tew | 250/551 |
| 5,481,133 A | 1/1996 | Hsu | 257/621 |
| 5,482,564 A | 1/1996 | Douglas et al. | 134/18 |
| 5,482,818 A | 1/1996 | Nelson | 430/394 |
| 5,483,307 A | 1/1996 | Anderson | 353/98 |
| 5,485,172 A | 1/1996 | Sawachika et al. | 345/8 |
| 5,485,304 A | 1/1996 | Kaeriyama | 359/291 |
| 5,485,354 A | 1/1996 | Ciupke et al. | 362/31 |
| 5,486,698 A | 1/1996 | Hanson et al. | 250/332 |
| 5,486,841 A | 1/1996 | Hara et al. | 345/8 |
| 5,486,946 A | 1/1996 | Jachimowicz et al. | 359/263 |
| 5,488,431 A | 1/1996 | Gove et al. | 348/716 |
| 5,489,952 A | 2/1996 | Gove et al. | 348/771 |
| 5,490,009 A | 2/1996 | Venkateswar et al. | 359/291 |
| 5,491,510 A | 2/1996 | Gove | 348/77 |
| 5,491,612 A | 2/1996 | Nicewarner, Jr. | 361/760 |
| 5,491,715 A | 2/1996 | Flaxl | 375/344 |
| 5,493,177 A | 2/1996 | Muller et al. | 313/578 |
| 5,493,439 A | 2/1996 | Engle | 359/292 |
| 5,497,172 A | 3/1996 | Doherty et al. | 345/85 |
| 5,497,197 A | 3/1996 | Gove et al. | 348/388 |
| 5,497,262 A | 3/1996 | Kaeriyama | 359/223 |
| 5,499,060 A | 3/1996 | Gove et al. | 348/651 |
| 5,499,062 A | 3/1996 | Urbanus | 348/771 |
| 5,500,761 A | 3/1996 | Goossen et al. | 359/290 |
| 5,502,481 A | 3/1996 | Dentinger et al. | 348/51 |
| 5,504,504 A | 4/1996 | Markandey et al. | 345/214 |
| 5,504,514 A | 4/1996 | Nelson | 347/130 |
| 5,504,575 A | 4/1996 | Stafford | 356/330 |
| 5,504,614 A | 4/1996 | Webb et al. | 359/223 |
| 5,506,171 A | 4/1996 | Leonard et al. | 437/187 |
| 5,506,597 A | 4/1996 | Thompson et al. | 345/85 |
| 5,506,720 A | 4/1996 | Yoon | 359/224 |
| 5,508,558 A | 4/1996 | Robinette, Jr. et al. | 257/700 |
| 5,508,561 A | 4/1996 | Tago et al. | 257/737 |
| 5,508,565 A | 4/1996 | Hatakeyama et al. | 257/777 |
| 5,508,750 A | 4/1996 | Hewlett et al. | 348/558 |
| 5,508,840 A | 4/1996 | Vogel et al. | 359/291 |
| 5,508,841 A | 4/1996 | Lin et al. | 359/318 |
| 5,510,758 A | 4/1996 | Fujita et al. | 333/247 |
| 5,510,824 A | 4/1996 | Nelson | 347/239 |
| 5,512,374 A | 4/1996 | Wallace et al. | 428/422 |
| 5,512,748 A | 4/1996 | Hanson | 250/332 |
| 5,515,076 A | 5/1996 | Thompson et al. | 345/139 |
| 5,516,125 A | 5/1996 | McKenna | 279/3 |
| 5,517,340 A | 5/1996 | Doany et al. | 359/41 |
| 5,517,347 A | 5/1996 | Sampsell | 359/224 |
| 5,517,357 A | 5/1996 | Shibayama | 359/547 |
| 5,517,359 A | 5/1996 | Gelbart | 359/623 |
| 5,519,251 A | 5/1996 | Sato et al. | 257/666 |
| 5,519,450 A | 5/1996 | Urbanus et al. | 348/600 |
| 5,521,748 A | 5/1996 | Sarraf | 359/321 |
| 5,523,619 A | 6/1996 | McAllister et al. | 257/686 |
| 5,523,628 A | 6/1996 | Williams et al. | 257/777 |
| 5,523,803 A | 6/1996 | Urbanus et al. | 348/771 |
| 5,523,878 A | 6/1996 | Wallace et al. | 359/290 |
| 5,523,881 A | 6/1996 | Florence | 359/561 |
| 5,523,920 A | 6/1996 | Machuga et al. | 361/767 |
| 5,524,155 A | 6/1996 | Weaver | 385/24 |
| 5,534,107 A | 7/1996 | Gray et al. | 156/643.1 |
| 5,534,883 A | 7/1996 | Koh | 345/3 |
| 5,539,422 A | 7/1996 | Heacock et al. | 345/8 |
| 5,544,306 A | 8/1996 | Deering et al. | 395/164 |
| 5,554,304 A | 9/1996 | Suzuki | 216/2 |
| 5,576,878 A | 11/1996 | Henck | 359/224 |
| 5,602,671 A | 2/1997 | Hornbeck | 359/224 |
| 5,606,181 A | 2/1997 | Sakuma et al. | 257/88 |
| 5,606,447 A | 2/1997 | Asada et al. | 359/199 |
| 5,610,438 A | 3/1997 | Wallace et al. | 257/682 |
| 5,623,361 A | 4/1997 | Engle | 359/291 |
| 5,629,566 A | 5/1997 | Doi et al. | 257/789 |
| 5,629,801 A | 5/1997 | Staker et al. | 359/572 |
| 5,640,216 A | 6/1997 | Hasegawa et al. | 349/58 |
| 5,658,698 A | 8/1997 | Yagi et al. | 430/11 |
| 5,661,592 A | 8/1997 | Bornstein et al. | 359/291 |
| 5,661,593 A | 8/1997 | Engle | 359/292 |
| 5,663,817 A | 9/1997 | Frapin et al. | 349/5 |
| 5,668,611 A | 9/1997 | Ernstoff et al. | 348/771 |
| 5,673,139 A | 9/1997 | Johnson | 359/291 |

| | | | |
|---|---|---|---|
| 5,677,783 A | 10/1997 | Bloom et al. ............... 359/224 |
| 5,689,361 A | 11/1997 | Damen et al. ............... 359/284 |
| 5,691,836 A | 11/1997 | Clark ........................ 359/247 |
| 5,694,740 A | 12/1997 | Martin et al. ................ 53/431 |
| 5,696,560 A | 12/1997 | Songer ....................... 348/436 |
| 5,699,740 A | 12/1997 | Gelbart ....................... 101/477 |
| 5,704,700 A | 1/1998 | Kappel et al. ................ 353/31 |
| 5,707,160 A | 1/1998 | Bowen ........................ 400/472 |
| 5,712,649 A | 1/1998 | Tosaki ........................ 345/8 |
| 5,713,652 A | 2/1998 | Zavracky et al. ............ 353/122 |
| 5,726,480 A | 3/1998 | Pister ........................ 257/415 |
| 5,731,802 A | 3/1998 | Aras et al. .................. 345/148 |
| 5,734,224 A | 3/1998 | Tagawa et al. ............. 313/493 |
| 5,742,373 A | 4/1998 | Alvelda ...................... 349/204 |
| 5,744,752 A | 4/1998 | McHerron et al. ......... 174/52.4 |
| 5,745,271 A | 4/1998 | Ford et al. .................. 359/130 |
| 5,757,354 A | 5/1998 | Kawamura .................. 345/126 |
| 5,757,536 A | 5/1998 | Ricco et al. ................. 359/224 |
| 5,764,280 A | 6/1998 | Bloom et al. ................ 348/53 |
| 5,768,009 A | 6/1998 | Little ......................... 359/293 |
| 5,770,473 A | 6/1998 | Hall et al. ................... 438/26 |
| 5,793,519 A | 8/1998 | Furlani et al. ............... 359/291 |
| 5,798,743 A | 8/1998 | Bloom ........................ 345/90 |
| 5,798,805 A | 8/1998 | Ooi et al. .................... 349/10 |
| 5,801,074 A | 9/1998 | Kim et al. ................... 438/125 |
| 5,802,222 A | 9/1998 | Rasch et al. ................. 385/1 |
| 5,808,323 A | 9/1998 | Spaeth et al. ................ 257/88 |
| 5,808,797 A | 9/1998 | Bloom et al. ................ 359/572 |
| 5,815,126 A | 9/1998 | Fan et al. .................... 345/8 |
| 5,825,443 A | 10/1998 | Kawasaki et al. ............ 349/95 |
| 5,835,255 A | 11/1998 | Miles ......................... 359/291 |
| 5,835,256 A | 11/1998 | Huibers ...................... 359/291 |
| 5,837,562 A | 11/1998 | Cho ............................ 438/51 |
| 5,841,579 A | 11/1998 | Bloom et al. ................ 359/572 |
| 5,844,711 A | 12/1998 | Long, Jr. ..................... 359/291 |
| 5,847,859 A | 12/1998 | Murata ....................... 359/201 |
| 5,862,164 A | 1/1999 | Hill ............................ 372/27 |
| 5,868,854 A | 2/1999 | Kojima et al. ............... 134/1.3 |
| 5,886,675 A | 3/1999 | Aye et al. .................... 345/7 |
| 5,892,505 A | 4/1999 | Tropper ...................... 345/208 |
| 5,895,233 A | 4/1999 | Higashi et al. ............... 438/107 |
| 5,898,515 A | 4/1999 | Furlani et al. ............... 359/290 |
| 5,903,243 A | 5/1999 | Jones ......................... 345/7 |
| 5,903,395 A | 5/1999 | Rallison et al. .............. 359/630 |
| 5,910,856 A | 6/1999 | Ghosh et al. ................ 359/291 |
| 5,912,094 A | 6/1999 | Aksyuk et al. ............... 430/5 |
| 5,912,608 A | 6/1999 | Asada ........................ 335/222 |
| 5,914,801 A | 6/1999 | Dhuler et al. ................ 359/230 |
| 5,915,168 A | 6/1999 | Salatino et al. .............. 438/110 |
| 5,919,548 A | 7/1999 | Barron et al. ................ 428/138 |
| 5,920,411 A | 7/1999 | Duck et al. .................. 359/127 |
| 5,920,418 A | 7/1999 | Shiono et al. ................ 359/246 |
| 5,923,475 A | 7/1999 | Kurtz et al. .................. 359/619 |
| 5,926,309 A | 7/1999 | Little ......................... 359/293 |
| 5,926,318 A | 7/1999 | Hebert ....................... 359/618 |
| 5,942,791 A | 8/1999 | Shorrocks et al. ........... 257/522 |
| 5,946,430 A * | 8/1999 | Morrow et al. .............. 385/24 |
| 5,949,390 A | 9/1999 | Nomura et al. .............. 345/32 |
| 5,949,570 A * | 9/1999 | Shiono et al. ................ 359/291 |
| 5,953,161 A | 9/1999 | Troxell et al. ............... 359/618 |
| 5,955,771 A | 9/1999 | Kurtz et al. .................. 257/419 |
| 5,963,788 A | 10/1999 | Barron et al. ................ 438/48 |
| 5,978,127 A | 11/1999 | Berg .......................... 359/279 |
| 5,982,553 A | 11/1999 | Bloom et al. ................ 359/627 |
| 5,986,634 A | 11/1999 | Alioshin et al. .............. 345/147 |
| 5,986,796 A | 11/1999 | Miles ......................... 359/260 |
| 5,995,303 A | 11/1999 | Honguh et al. .............. 359/708 |
| 5,999,319 A | 12/1999 | Castracane .................. 359/573 |
| 6,004,912 A | 12/1999 | Gudeman ................... 508/577 |
| 6,016,222 A | 1/2000 | Setani et al. ................. 359/571 |
| 6,023,545 A * | 2/2000 | Eldada et al. ................ 385/37 |
| 6,025,859 A | 2/2000 | Ide et al. ..................... 347/135 |
| 6,038,057 A | 3/2000 | Brazas, Jr. et al. ......... 359/291 |
| 6,040,748 A | 3/2000 | Gueissaz ..................... 335/78 |
| 6,046,840 A | 4/2000 | Huibers ...................... 359/291 |
| 6,055,090 A | 4/2000 | Miles ......................... 359/291 |
| 6,057,520 A | 5/2000 | Goodwin-Johansson .... 200/181 |
| 6,061,166 A | 5/2000 | Furlani et al. ............... 359/254 |
| 6,061,489 A | 5/2000 | Ezra et al. ................... 385/115 |
| 6,062,461 A | 5/2000 | Sparks et al. ............. 228/123.1 |
| 6,064,404 A | 5/2000 | Aras et al. ................... 345/507 |
| 6,069,392 A | 5/2000 | Tai et al. ..................... 257/419 |
| 6,071,652 A | 6/2000 | Feldman et al. ............. 430/5 |
| 6,075,632 A | 6/2000 | Braun ........................ 359/124 |
| 6,084,626 A | 7/2000 | Ramanujan et al. ......... 347/239 |
| 6,088,102 A | 7/2000 | Manhart ..................... 356/354 |
| 6,090,717 A | 7/2000 | Powell et al. ................ 438/710 |
| 6,091,521 A | 7/2000 | Popovich .................... 359/15 |
| 6,096,576 A | 8/2000 | Corbin et al. ................ 438/108 |
| 6,097,352 A | 8/2000 | Zavracky et al. ............ 345/7 |
| 6,101,036 A | 8/2000 | Bloom ........................ 359/567 |
| 6,115,168 A | 9/2000 | Zhao et al. .................. 359/247 |
| 6,122,299 A | 9/2000 | DeMars et al. .............. 372/20 |
| 6,123,985 A | 9/2000 | Robinson et al. ............ 427/162 |
| 6,124,145 A | 9/2000 | Stemme et al. .............. 438/26 |
| 6,130,770 A | 10/2000 | Bloom ........................ 359/224 |
| 6,144,481 A | 11/2000 | Kowarz et al. .............. 359/291 |
| 6,147,789 A | 11/2000 | Gelbart ....................... 359/231 |
| 6,154,259 A | 11/2000 | Hargis et al. ................ 348/756 |
| 6,163,026 A | 12/2000 | Bawolek et al. ............. 250/351 |
| 6,163,402 A | 12/2000 | Chou et al. .................. 359/443 |
| 6,169,624 B1 | 1/2001 | Godil et al. ................. 359/237 |
| 6,172,796 B1 | 1/2001 | Kowarz et al. .............. 359/290 |
| 6,172,797 B1 | 1/2001 | Huibers ...................... 359/291 |
| 6,177,980 B1 | 1/2001 | Johnson ...................... 355/67 |
| 6,181,458 B1 * | 1/2001 | Brazas et al. ................ 359/290 |
| 6,188,519 B1 | 2/2001 | Johnson ...................... 359/572 |
| 6,195,196 B1 | 2/2001 | Kimura et al. ............... 359/295 |
| 6,197,610 B1 | 3/2001 | Toda .......................... 438/50 |
| 6,210,988 B1 | 4/2001 | Howe et al. ................. 438/50 |
| 6,215,579 B1 | 4/2001 | Bloom et al. ................ 359/298 |
| 6,219,015 B1 | 4/2001 | Bloom et al. ................ 345/87 |
| 6,222,954 B1 | 4/2001 | Riza ........................... 385/18 |
| 6,229,650 B1 | 5/2001 | Reznichenko et al. ....... 359/566 |
| 6,229,683 B1 | 5/2001 | Goodwin-Johansson .... 361/233 |
| 6,241,143 B1 | 6/2001 | Kuroda ..................... 228/110.1 |
| 6,251,842 B1 | 6/2001 | Gudeman ................... 508/577 |
| 6,252,697 B1 | 6/2001 | Hawkins et al. ............. 359/290 |
| 6,254,792 B1 | 7/2001 | Van Buskirk et al. ........ 216/13 |
| 6,261,494 B1 | 7/2001 | Zavracky et al. ............ 264/104 |
| 6,268,952 B1 | 7/2001 | Godil et al. ................. 359/291 |
| 6,271,145 B1 | 8/2001 | Toda .......................... 438/706 |
| 6,271,808 B1 | 8/2001 | Corbin ....................... 345/7 |
| 6,274,469 B1 | 8/2001 | Yu ............................. 438/592 |
| 6,290,859 B1 | 9/2001 | Fleming et al. .............. 216/2 |
| 6,290,864 B1 | 9/2001 | Patel et al. ................... 216/79 |
| 6,300,148 B1 | 10/2001 | Birdsley et al. .............. 438/15 |
| 6,303,986 B1 | 10/2001 | Shook ........................ 257/680 |
| 6,310,018 B1 | 10/2001 | Behr et al. ................... 510/175 |
| 6,323,984 B1 | 11/2001 | Trisnadi ..................... 359/245 |
| 6,327,071 B1 | 12/2001 | Kimura ...................... 359/291 |
| 6,342,960 B1 | 1/2002 | McCullough ................ 359/124 |
| 6,356,577 B1 | 3/2002 | Miller ........................ 372/107 |
| 6,356,689 B1 | 3/2002 | Greywall .................... 385/52 |
| 6,359,333 B1 | 3/2002 | Wood et al. ................. 257/704 |
| 6,384,959 B1 | 5/2002 | Furlani et al. ............... 359/291 |
| 6,387,723 B1 | 5/2002 | Payne et al. ................. 438/48 |
| 6,392,309 B1 | 5/2002 | Wataya et al. ............... 257/796 |
| 6,396,789 B1 | 5/2002 | Guerra et al. ................ 369/112 |
| 6,421,179 B1 | 7/2002 | Gutin et al. .................. 359/572 |
| 6,445,502 B1 | 9/2002 | Islam et al. .................. 359/571 |
| 6,452,260 B1 | 9/2002 | Corbin et al. ................ 257/686 |
| 6,466,354 B1 | 10/2002 | Gudeman ................... 359/247 |
| 6,480,634 B1 | 11/2002 | Corrigan ..................... 385/4 |
| 6,497,490 B1 | 12/2002 | Miller ........................ 359/614 |
| 6,525,863 B1 | 2/2003 | Riza ........................... 359/290 |

| | | | | |
|---|---|---|---|---|
| 6,563,974 B2 | 5/2003 | Riza ............................ 385/18 |
| 6,565,222 B1 | 5/2003 | Ishii et al. .................. 359/883 |
| 6,636,654 B2 * | 10/2003 | McGuire, Jr. ................ 385/17 |
| 6,658,212 B1 * | 12/2003 | Trutna et al. ................ 398/84 |
| 6,721,473 B1 * | 4/2004 | Islam et al. .................. 385/18 |
| 6,829,409 B2 * | 12/2004 | Koch et al. .................. 385/27 |
| 7,068,372 B1 * | 6/2006 | Trisnadi et al. ............ 356/450 |
| 2001/0019454 A1 | 9/2001 | Tadic-Galeb et al. ....... 359/649 |
| 2002/0015230 A1 | 2/2002 | Pilossof et al. ............ 359/558 |
| 2002/0021485 A1 | 2/2002 | Pilossof ...................... 359/295 |
| 2002/0079432 A1 | 6/2002 | Lee et al. ................... 250/216 |
| 2002/0105725 A1 | 8/2002 | Sweatt et al. ............... 359/566 |
| 2002/0112746 A1 | 8/2002 | DeYoung et al. ............. 134/36 |
| 2002/0131230 A1 | 9/2002 | Potter ......................... 361/277 |
| 2002/0196492 A1 * | 12/2002 | Trisnadi et al. ............. 359/124 |

FOREIGN PATENT DOCUMENTS

| | | |
|---|---|---|
| EP | 0 261 901 A2 | 3/1988 |
| EP | 0 314 437 A1 | 10/1988 |
| EP | 0 304 263 A2 | 2/1989 |
| EP | 0 306 308 A2 | 3/1989 |
| EP | 0 322 714 A2 | 7/1989 |
| EP | 0 627 644 A3 | 9/1990 |
| EP | 0 417 039 A1 | 3/1991 |
| EP | 0 423 513 A2 | 4/1991 |
| EP | 0 436 738 A1 | 7/1991 |
| EP | 0 458 316 A2 | 11/1991 |
| EP | 0 477 566 A2 | 4/1992 |
| EP | 0 488 326 A3 | 6/1992 |
| EP | 0 499 566 A2 | 8/1992 |
| EP | 0 528 646 A1 | 2/1993 |
| EP | 0 530 760 A2 | 3/1993 |
| EP | 0 550 189 A1 | 7/1993 |
| EP | 0 610 665 A1 | 8/1994 |
| EP | 0 627 644 A2 | 12/1994 |
| EP | 0 627 850 A1 | 12/1994 |
| EP | 0 643 314 A2 | 3/1995 |
| EP | 0 654 777 A1 | 5/1995 |
| EP | 0 658 868 A1 | 6/1995 |
| EP | 0 689 078 A1 | 12/1995 |
| EP | 685 830 A1 | 12/1995 |
| EP | 0 801 319 A1 | 10/1997 |
| EP | 0 851 492 A2 | 7/1998 |
| EP | 1 003 071 A2 | 5/2000 |
| EP | 1 014 143 A1 | 6/2000 |
| EP | 1 040 927 A2 | 10/2000 |
| GB | 2 117 564 A | 10/1983 |
| GB | 2 118 365 A | 10/1983 |
| GB | 2 266 385 A | 10/1993 |
| GB | 2 296 152 A | 6/1996 |
| GB | 2 319 424 A | 5/1998 |
| WO | WO 90/13913 | 11/1990 |
| WO | WO 92/12506 | 7/1992 |
| WO | WO 93/02269 | 2/1993 |
| WO | WO 93/09472 | 5/1993 |
| WO | WO 93/18428 | 9/1993 |
| WO | WO 93/22694 | 11/1993 |
| WO | WO 94/09473 | 4/1994 |
| WO | WO 94/29761 | 12/1994 |
| WO | WO 95/11473 | 4/1995 |
| WO | WO 96/02941 | 2/1996 |
| WO | WO 96/08031 | 3/1996 |
| WO | WO 96/41217 | 12/1996 |
| WO | WO 96/41224 | 12/1996 |
| WO | WO 97/22033 | 6/1997 |
| WO | WO 97/26569 | 7/1997 |
| WO | WO 98/05935 | 2/1998 |
| WO | WO 98/24240 | 6/1998 |
| WO | WO 98/41893 | 9/1998 |
| WO | WO 99/07146 | 2/1999 |
| WO | WO 99/12208 | 3/1999 |
| WO | WO 99/23520 | 5/1999 |
| WO | WO 99/34484 | 7/1999 |
| WO | WO 99/59335 | 11/1999 |
| WO | WO 99/63388 | 12/1999 |
| WO | WO 99/67671 | 12/1999 |
| WO | WO 00/04718 | 1/2000 |
| WO | WO 00/07225 | 2/2000 |
| WO | WO 01/04674 A1 | 1/2001 |
| WO | WO 01/006297 A3 | 1/2001 |
| WO | WO 01/57581 A3 | 8/2001 |
| WO | WO 02/025348 A3 | 3/2002 |
| WO | WO 02/31575 A2 | 4/2002 |
| WO | WO 02/058111 A2 | 7/2002 |
| WO | WO 02/065184 A3 | 8/2002 |
| WO | WO 02/073286 A2 | 9/2002 |
| WO | WO 02/084375 A1 | 10/2002 |
| WO | WO 02/084397 A3 | 10/2002 |
| WO | WO 03/001281 A1 | 1/2003 |
| WO | WO 03/001716 A1 | 1/2003 |
| WO | WO 03/012523 A1 | 2/2003 |
| WO | WO 03/016965 A1 | 2/2003 |
| WO | WO 03/023849 A1 | 3/2003 |
| WO | WO 03/025628 A2 | 3/2003 |

OTHER PUBLICATIONS

O. Solgaard "Integrated Semiconductor Light Modulators for Fiber-Optic and Display Applications", Ph.D. Dissertation, Stanford University Feb. 1992.

R. Gerhard-Multhaupt, "Light-Valve Technologies for High-Definition Television Projection Displays", Displays vol. 12, No. 3/4 (1991), pp. 115-128.

O. Solgaard F. Sandejas, and D. Bloom, "Deformable Grating Optical Modulator," Optics Letters, vol. 17, No. 9, May 1, 1992, New York, USA, pp. 688-690.

F. Sandejas, R. Apte, W. Banyai, and D. Bloom, "Surface Microfabrication of Deformable Grating Valve for High Resolution Displays," The 7th International Conference on Solid-State Sensors and Actuators, 1993.

P. Alvelda, "High-Efficiency Color Microdisplays," SID 95 Digest, pp. 307-311, 1995.

Worboys et al., "Miniature Display Technology for Integrated Helmut Systems," GEC Journal of Research, vol. 10, No. 2, pp. 111-118, Chelmsford, Essex, GB 1993.

M. Farn et al., "Color Separation by use of Binary Optics," Optics Letters, vol. 18:15 pp. 121-1216, 1993.

P. Alvelda, "VLSI Microdisplays and Optoelectric Technology," MIT, pp. 1-93, 1995.

P. Alvelda, "VLSI Microdisplay Technology," Oct. 14, 1994.

L. Hornbeck, "Deformable-Mirror Spatial Light Modulators," Spatial Light Modulators and Applications III, Aug. 8, CA 1989, pp. 86-102.

Russick et al., "Supercritical Carbon Dioxide Extraction of Solvent from Micromachined Structures," Supercritical Fluids, Chapter 18, American Chemical Society, pp. 255-269; 1997.

Gani et al., "Variable Gratings for Optical Switching Rigorous Electromagnetic Simulation and Design," Optical Engineering, vol. 38, No. 3, pp. 552-557, Mar. 1999.

R. Tepe, et al. "Viscoelastic Spatial Light Modulator with Active Matrix Addressing," Applied Optics, vol. 28, No. 22, New York, USA, pp. 4826-4834, Nov. 15, 1989.

W. Brinker, et al., "Deformation Behavior of Thin Viscoelastic Layers Used in an Active-Matrix-Addressed Spatial Light Modulator," SPIE vol. 1018, pp. 79-85, Germany, 1988.

T. Utsunomiya and H. Sato, "Electrically Deformable Echellette Grating and its Application to Tunable Laser Resonator," Electronics and Communications in Japan, vol. 63-c, No. 10, pp. 94-100, Japan, 1980.

Burn, D.M. et al., *Development of microelectromechnical variable blaze gratings,* Sensors and Actuators A, pp. 7-15, 1998.

"Kitchen Computer", IBM Technical Disclosure Bulletin, vol. 37, No. 12, pp. 223-225, Dec. 1994.

"Image Orientation Sensing and Correction for Notepads", Research Disclosure, No. 34788, p. 217, Mar. 1993.

Beck Mason et al., "Directly Modulated Sampled Grating DBR Lasers for Long-Haul WDM Communication Systems" IEEE Photonicas Technology Letters, vol. 9, No. 3, Mar. 1997. pp. 377 of 379.

N. J. Frigo et al., "A Wavelength-Division Multiplexed Passive Optical Network with Cost-Shared Components", IEEE Photonics Technology Letters, vol. 6, No. 11, Nov. 1994, pp. 1365 of 1367.

M. S. Goodman et al., "The LAMBDANET Multiwavelength Network: Architecture, Applications, and Demonstrations", IEEE Journal on Selected Areas in Communications, vol. 8, No. 6, Aug. 1990, pp. 995 of 1004.

C. A. Turkatte, "Examining the Benefits of Tunable Lasers for Provisioning Bandwidth on Demand", EuroForum—Optical Components, Feb. 2001, p. 1 of 10.

R. Plastow, "Tunable Lasers and Future Optical Networks", Forum-Tunable Laser, Aug. 2000, p. 58 of 62.

Elizabeth Bruce, "Tunable Lasers", Communications, IEEE Spectrum, Feb. 2002, p. 35 of 39.

M. G. Littman et al., "Spectrally Narrow Pulsed Dye Laser without Beam Expander", Applied Optics, vol. 17, No. 14, Jul. 15, 1978, p. 2224 of 2227.

Apte et al., "Deformable Grating Light Valves for High Resolution Displays," Solid State Actuator Workshop, Hilton Head, South Carolina, Jun. 13-16, 1994.

Sene et al., "Polysilicon micromechnical gratings for optical modulation," Sensors and Actuators, vol. A57, pp. 145-151, 1996.

Amm et al., "Invited Paper: Grating Light Valve™ Technology: Update and Novel Applications," SID Digest, vol. 29, 1998.

Development of Digital MEMS-Based Disply Technology Promises Improved Resolution, Contrast, and Speed, XP-000730009, 1997, p. 33 of 34.

"Micromachined Opto/Electro/Mechanical Systems," Electronic Systems, NASA Tech Briefs, Mar. 1997 pp. 50 & 52.

S.T. Pai, et al., "Electromigration in Metals", Received Jun. 4, 1976, pp. 103-115.

Olga B. Spahn, eta l., "High Optical Power Handling of Pop-Up Microelectromechanical Mirrors", Sandia National Laboratories, IEEE 2000, pp. 51-52.

David M. Burns, et al. "Optical Power Induced Damage to Microelectromechanical Mirrors", Sensors and Actuators A 70, 1998, pp. 6-14.

V.S. Aliev et al., "Development of Si(100) surface roughness at the initial stage of etching in F2 and XeF2 gases: ellipsometric study," Surface Science 442 (1999), pp. 206-214.

Xuan-Qi Wang et al., "Gas-Phase Silicon Etching with Bromine Trifluoride," Depart. of Electrical Engineering, 136-93 California Instute of Technology, 1997 IEEE, pp. 1505-1508.

Harold F. Winters, "Etch products from the reaction of XeF2 with SiO2, Si3N4, SiC, and Si in the presence of Ion Bombardment," IBM Research Laboratory, 1983 American Vacuum Society, pp. 927-931.

F.A. Houle, "Dynamics of SiF4 desorption during etching of silicon by XeF2," J. Chem. Phys. 87(3), Aug. 1, 1987, pp. 1866-1872.

Mehran Mehregarry, "Microelectromechanical Systems," 1993 IEEE, pp. 14-22

D. Moser et al., "A CMOS Compatible Thermally Excited Silicon Oxide Beam Resonator with Aluminium Mirror," Physical Electronics Laboratory, 1991 IEEE, pp. 547-550.

M. Parameswaran et al., "Commercial CMOS Fabricated Integrated Dynamic Thermal Scene Simulator," 1991 IEEE, pp. 29.4.1-29.4.4.

M. Parameswaran et al., "CMOS Electrothermal Microactuators," Depart. of Electrical Engineering, 1990 IEEE, pp. 128-131.

U. Streller et al., "Selectivity in dry etching of Si(100) with XeF2 and VUV light," Applied Surface Science 106, (1996), pp. 341-346.

M.J.M. Vugts et al., "Si/XeF2 etching: Temperature dependence," 1996 American Vacuum Society, pp. 2766-2774.

P. Krummenacher et al., "Smart Temperature Sensor in CMOS Technology," Sensors and Actuators, A-21-A-23 (1990), pp. 636-638.

Henry Baltes, "CMOS as sensor technology," Sensors and Actuators A. 37-38, (1993), pp. 51-56.

Thomas Bolshauser et al., "Piezoresistive Membrane Hygrometers Based on IC Technology," Sensor and Materials, 5, 3, (1993), pp. 125-134.

Z. Parpie et al., "Modelling of CMOS Compatible High Voltage Device Structures," pp. 41-50, IEEE Transaction on Electron Devices, Nov. 1987.

Jon Gildemeister, "Xenon Difluoride Etching System," 1997, UC Berkeley MicroTabrication Manual Chapter 7.15, pp. 2-5.

W. Riethmuller et al., "A smart accelerometer with on-chip electronics fabricated by a commercial CMOS process," Sensors and Actuators A. 31, (1992), 121-124.

W. Gopel et al., "Sensors- A Comprehensive Survey," vol. 7, Weinheim New York, 44 pgs, Oct. 1997.

D. E. Ibbotson et al., "Comparison of XeF2 and F-atom reations with Si and SiO2," 1984 American Institute of Physics, pp. 1129-1131.

D. E. Ibbotson et al., "Plasmaless dry etching of silicon with fluorine-containing compounds," 1984 American Institue of Physics, pp. 2939-2942.

M.H. Hecht et al., "A novel x-ray photelectron spectroscopy study of thAI/SiO2 interfaces," 1985 American Institue of Physics, pp. 5256-52616.

Daniel, I.. Flamm et al., "XeF2 and F-Atom Reaction with Si: Their Significance for Plasma Etching," Solid State Technology, V.26, #4, 4/83, pp. 117-121.

H.F. Winters et al., "The etching of silicon with XeF2 vapor," Appl. Phys. Lett. vol. 34, No. 1, Jan. 1979, pp. 70-73.

Wayne Bailey et al., "Microelectronic Structures and Microelectromechanical Devices for Optical Processing and Multimedia Applications," SPIE—The International Society for Optical Engineering, vol. 2641, Oct. 1995, 13 pgs.

J. Marshall et al., "realizing Suspended Structures on Chips Fabricated by CMOS Foundry Processes Through the MOSIS Service," National Inst. of Standards and Technology, Jun. 94, 63 pgs.

David Moser et al., "CMOS Flow Sensors," 1993 Physical Electronics Lab, Swiss Federal Institute of Tech, Zurich, Switerland, 195 pgs.

E. Hecht, "Optics", Addison-Wesley, $2^{nd}$ edition, 1987, Adelphi University, pp. 163-169.

E. Hecht, "Optics", Addison-Wesley, $2^{nd}$ edition, 1987, Adelphi University, pp. 358-360.

T. Glaser et al., "Beam switching with binary single-order diffractive grating", XP-000802142, Optics Letters, Dec. 15, 1998, vol. 23, No. 24, p. 1933 of 1935.

P. C. Kundu et al., "Reduction of Speckle Noise by Varying the Polarisation of Illuminating Beam", XP-002183475, Dept. of Applied Physics, Calcutta University, 1975, pp. 63-67.

J. W. Goodman, "Some Fundamental Properties of Speckle", XP-002181682, Dept. of Electrical Engineering, Stanford University, 1976, pp. 1146-1150.

Lingli Wang et al., "Speckle Reduction in Laser Projection Systems by Diffractive Optical Elements", XP-000754330, Applied Optics, Apr. 1, 1998, vol. 37, No. 10, pp. 1770-1775.

R.W. Corrigan et al., "Calibration of a Scanned Linear Grating Light-Valve, Projection System for E-Cinema Applications", Silicon Light Machines, SID'99, San Jose, CA, 27 pgs, 1999.

R.W. Corrigan et al., "Calibration of a Scanned Linear Grating Light-Valve, Projection System", Silicon Light Machines, San Jose, CA, 4 pgs, May 18, 1999.

"Introduction to Cryptography", http://www.ssh.fi/tech/crpto/into.html, 35 pgs, Jun. 21, 1999.

"Deep Sky Black," Equinox Interscience, www. eisci.com/deepsky.html, 1997.

"Absorptive Neutral Density Filters," Newport Corp., Irvine, CA, www.newport.com, May 7, 1999.

"High Energy Variable Attenuators," Newport Corp., Irvine, CA, www.newport.com, May 7, 1999.

"Neutral-Density Filters," New Focus, Inc., Santa Clara, CA, www.newfocus.com, May 7, 1999.

J. Hawkes et al., "Laser Theory and Practice," Prentice Hall, New York, 1995, pp. 407-408.

C. Tew et al., "Electronic Control of a Digital Micromirror for Projection Displays", Proceedings of the 1994 IEEE International Solid-State Circuits Conference, 1994.

Henck, S.A., "Lubrication of Digital Micromirror Devices™", Tribology Letters, No. 3, pp. 239-247, 1997.

K. W. Goossen et al., "Silicon Modulator Based on Mechanically-Active Anti-Reflection Layer with 1 Mbit/sec Capability for Fiber-in-the-Loop Applications", IEEE Protonics Technology Letters, vol. 6, No. 9, Sep. 1994, pp. 1119-1121.

J. A. Walker et al., "Demonstration of a Gain Flattened Optical Amplifier with Micromechanical Equalizer Element", Lucent Technologies, pp. 13-14, Solid State Sensor & Actuator Workshop, Jun. 1998.

A. P. Payne et al., "Resonance Measurements of Stresses in Al/Si$_3$n$_4$ N, Micro-Ribbons", Silicon Light Machines, Sep. 22, 1999, 11 pgs.

M. W. Miles, "A New Reflective FPD Technology Using Interferometric Modulation", 4 pgs, journal of Society for Information Disply vol. 5, No. 4 Dec. 1997.

N. A. Riza et al., "Digitally Controlled Fault-Tolerant Multiwavelength Programmable Fiber-Optic Attenuator Using a Two-Dimensional Digital Micromirror Device", Optics Letters, Mar. 1, 1999, vol. 24, No. 5, pp. 282-284.

N. A. Riza et al., "Synchronous Amplitude and Time Control for an Optimum Dynamic Range Variable Photonic Delay Line", Applied Optics, Apr. 10, 1999, vol. 38, No. 11, pp. 2309-2318.

P. Alvelda et al., "44.4: Ferroelectric Microdisplays Using Distortion-Compensated Pixel Layouts", SID 95 DIGEST, XP 2020715, pp. 931-933.

* cited by examiner

RECONFIGURABLE MODULATOR-BASED OPTICAL ADD-AND-DROP MULTIPLEXER

FIELD OF THE INVENTION

The present invention relates to an add-and-drop multiplexer. More particularly, this invention relates to a reconfigurable modulator-based optical add-and-drop multiplexer system.

BACKGROUND OF THE INVENTION

In a WDM (wavelength division multiplex) optical communication system, multiple component wavelengths of light each carry a communication signal. Each of the multiple component wavelengths of light form a WDM channel. An optical add-drop multiplexer (OADM) is used for managing the WDM signals that are carried from location to location using the WDM channels. At a particular location, the WDM signal within each WDM channel is either passed for transmission to another location, is added for transmission or is dropped for local distribution. As a component signal or channel is dropped, the component signal or channel corresponding to the dropped component signal or dropped channel is free to accept an added component signal or channel. The new added component signal is uploaded into the WDM signal at the same wavelength as the dropped component signal. Maintaining an active signal in each channel maximizes total bandwidth.

The purpose of wavelength division multiplexing is to carry multiple signals over the same medium at the same time. To accomplish this, a number of channels are used. However, different signals may need to be transmitted to different locations at any time. Thus, if a given component signal is transmitted for the predetermined distance, that component signal is dropped and another component signal is added it is place, thereby maximizing the total bandwidth.

FIG. 1 schematically illustrates a functional diagram of an optical add and drop multiplexer 10 for carrying multiple signals over the same medium. Shown in FIG. 1 is an optical add and drop multiplexer (OADM) 10 having two WDM input signals 12, 14 and two WDM output signals 16, 18. Of the two WDM input signals 12, 14, the WDM input signal 12 includes within, component signals or WDM channels 1, 2, 3, 4 and 5. In addition, the WDM input signal 14, also called an WDM add signal 14, shown in FIG. 1, includes channels or component signals 1', 2', 3', 4' and 5', some of which are to be added to the WDM input signal 12. Of the two WDM output signals 16, 18, the WDM output signal 16 includes WDM channels or component signals that correspond to the combination of the multiplexed signals of the WDM input signals 12 and 14.

In FIG. 1, the WDM input signal 12 contains component signals 1, 2, 3, 4 and 5, whereas the WDM add signal 14 contains three component signals, 2', 4' and 5' which are to be added to the WDM input signal 12. The three component signals to be added, 2', 4' and 5' contain local information which are uploaded by the OADM 10. The two WDM input signals 12, 14 are multiplexed, whereby the OADM 10 adds the three component signals 2', 4' and 5' from the WDM add signal 14 and drops the corresponding three component signals 2, 4 and 5 from the WDM input signal 12. The three component signals 2, 4 and 5 are then dropped for local distribution at a given location, which may be the same or different location from where the added component signals 2', 4' and 5' are uploaded. Component signals 2', 4' and 5' are modulated at the same wavelength as component signals 2, 4 and 5. The added component signals 2', 4' and 5' are also interlaced with the two passed component signals 1 and 3 to form a WDM output signal containing channels 1, 2', 3, 4' and 5'. This process is referred to as an add/drop function.

To perform the add/drop function, the component signals within the WDM signal must be isolated. Conventionally, a multiplexer/de-multiplexer is used to separate the component signals and an array of waveguides are used to direct each component signal to a desired location. Waveguides tend to be expensive, they are typically delicate to set-up and maintain, and often use extensive thermal management.

Once the component signals are isolated MEMS (Micro-ElectroMechanical System) mirrors or tilting mirrors are often used to reflect each component signal in a predetermined direction. The component signal is either passed or dropped depending on the predetermined direction. To predetermine a direction, the mirrors are moved or rotated using some type of mechanical means, for example a piezoelectric or pico-motor. Such mechanical movement produces mirror movements that may be less precise than desired. Mechanical movement also limits the speed by which the mirrors can be moved, and thus limits the speed by which the channels can be added/dropped.

An alternative means to perform the add/drop function is to use a Mach-Zehnder interferometer for each component signal. The Mach-Zehnder interferometer is an amplitude splitting device consisting of two beam splitters and two totally reflecting mirrors. The component signal is split into two portions and each portion is directed along separate optical paths. The two portions are eventually recombined. When recombined the two portions either constructively interfere or destructively interfere depending on whether or not the component signal is to be passed or dropped, respectively. The type of interference is determined by the phase difference between the two portions upon recombination. Changing the optical path lengths of one or both of the two portions can alter the phase difference. A difference between the optical path lengths can be introduced by a slight tilt of one of the beam splitters. To tilt the beam splitter though uses some type of mechanical means, which once again limits speed and precision. Also, since the two paths are separated, the Mach-Zehnder interferometer is relatively difficult to align and maintain. Mach-Zehnder interferometers are also expensive and often utilize extensive thermal management.

What is also needed is a method of adding and dropping channels within a WDM signal that is less expensive and simpler to implement and maintain than conventional optical add/drop multiplexers, and that increases speed and improves precision.

SUMMARY OF THE INVENTION

In one aspect of the invention, an optical add and drop multiplexer system comprises a first module for providing a first signal and a second module for providing a second signal. The system also comprises a modulator which receives a channel of the first signal at a first location. The first location is configured to actuate between a first position and a second position, wherein the modulator directs the channel of the first signal as an output signal when the first location is in the first position. The first module is configured to output the output signal. The system further comprises a diffraction grating which produces the first and second component signals from the respective first and second signals, wherein the diffraction grating directs the first and second component signals between the grating light valve and the first module. The first module comprises an input/ output circulator which inputs and outputs the first signal and a polar diversity optical module for directing the first signal between the input/output circulator and the diffraction grating. The modulator, preferably a grating light valve, directs the channel of the first signal as a dropped signal when the first location is in the second position. The grating light valve is alternatively a blazed grating light valve. The second module directly couples a channel of the second signal with the output signal, wherein the second module comprises an add/drop circulator which adds and drops the second signal and an add/drop PDM for directing the second signal between the add/drop circulator and the diffraction grating. The modulator receives a channel of the second signal from the second module at a second location which is configured to independently actuate between the first position and the second position. The modulator combines the channel of the second signal with the output signal when the second location is in the second position. Alternatively, the modulator drops the channel of the second signal when the second location is in the first position. The system further comprises a multiplexing source which dynamically equalizes the output signal, wherein the multiplexing module is coupled to the second module configured to drop the dropped signal. The grating light valve further comprises a reflective element that is configured to be actuated between the first position and the second position, wherein electric bias is applied between the reflective element and a substrate. The grating light valve further comprises a controller which provides control signals such that the reflective element is actuated based on a desired output signal.

In another aspect of the present invention, an apparatus for modulating a first wavelength division multiplexed (WDM) signal with a second WDM signal. The apparatus comprises a first module which provides a first component signal of the first WDM signal and a second module which provides a second component signal of the second WDM signal. The second module preferably directly couples the second component of the second signal with the output signal. The apparatus also comprises a grating light valve which receives the first WDM signal and the second WDM signal and includes a first reflective surface. The first reflective surface is actuated between a first position and a second position, whereby the grating light valve outputs the first component signal when the first reflective surface is in the first position and drops the first component signal when the first reflective surface is in the second position. The grating light valve further comprises a second reflective surface, wherein the second reflective surface is actuated between the first position and the second position. The grating light valve drops the second component signal when the second reflective surface is in the first position and outputs the second component signal when the second reflective surface is in the second position. The grating light valve thereby combines the first component signal with the second component signal to form an output signal from the first component and second component signals that are to be output. The apparatus further comprises a diffraction grating which produces the first component signal from the first signal and the second component signals from the second signal. The diffraction grating, preferably in a blazed configuration, directs the first and second component signals between the first and second module and the grating light valve.

In yet another aspect of the invention, an apparatus for modulating a first signal with a second signal. The apparatus comprises means for inputting the first signal, wherein the first signal includes a first component. The apparatus also comprises means for inputting a second signal, wherein the second signal includes a second component. The apparatus also includes means for modulating the first signal and second signal, wherein the means for modulating receives the first component at a predetermined location. Additionally, the means for modulating combines the first component with the second component to form a desired output signal based on a desired position of the predetermined location.

DETAILED DESCRIPTION OF THE PREFERRED EMBODIMENT

The present invention overcomes the aforementioned deficiencies of the prior art by providing an optical add and drop multiplexer system using a grating light valve to add and drop channels within a WDM signal. The WDM signal is de-multiplexed, preferably using free-space optics and a static diffraction grating, into its component wavelength signals. Each component signal is then mapped to the grating light valve, whereby the grating light valve is used to add, drop or pass each corresponding component signal. If the component signal is dropped, a new component signal is added at the corresponding wavelength of the dropped component signal.

In one aspect of the invention, an optical add and drop multiplexer system comprises a first module for providing a first signal and a second module for providing a second signal. The system also comprises a modulator which receives a channel of the first signal at a first location. The first location is configured to actuate between a first position and a second position, wherein the modulator directs the channel of the first signal as an output signal when the first location is in the first position.

Figure 1:
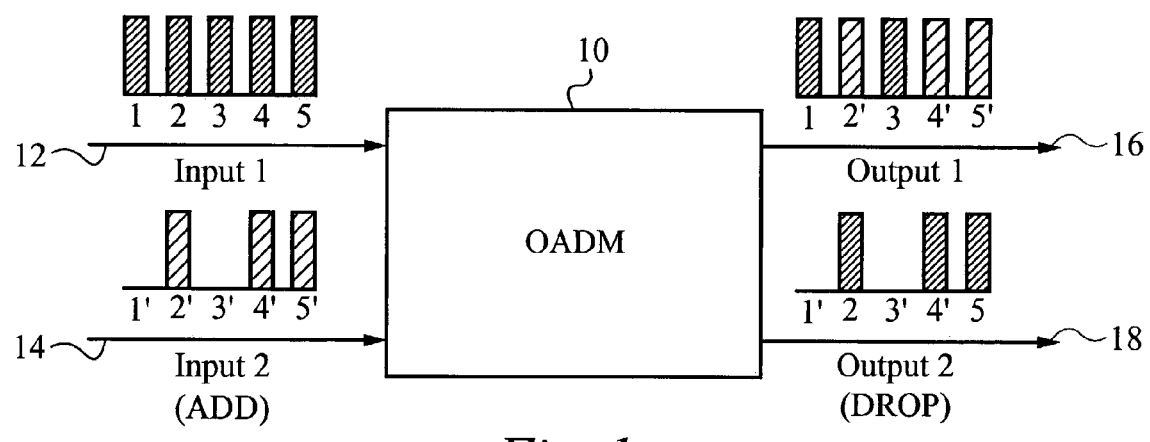
FIG. 1 illustrates a functional diagram of an optical add and drop multiplexer for carrying multiple signals over the same medium.
Figure 2:
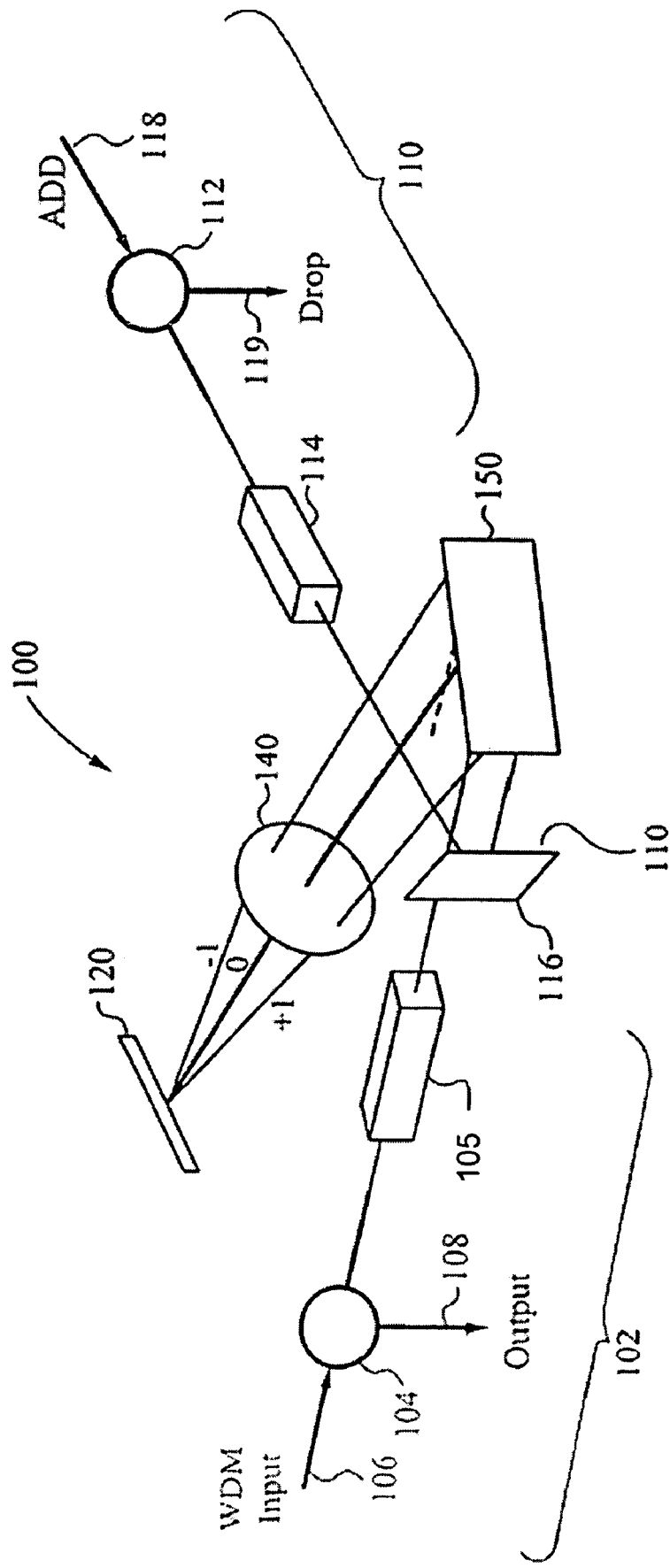
FIG. 2 illustrates a top view of the optical add-drop multiplexer (OADM) system according to the preferred embodiment of the present invention.

FIG. 2 illustrates a top view of the optical add-drop multiplexer (OADM) system 100 according to the preferred embodiment of the present invention as applied to a single channel. The basic configuration illustrated in FIG. 1 can equally be applied to any number of channels. Preferably, as stated above, each channel corresponds to one or more component signals within a WDM signal, whereby the component signal is a light signal having a wavelength.

The system 100, as shown in FIG. 2, preferably includes a first optical train 102, a second optical train 110, a modulator 120, a diffraction grating 150 and a transform lens 140. The first optical train or module 102, preferably includes an input/output circulator 104 and an in/out polarization-diversity optical module (PDM) 105. The second optical train or module 110 preferably includes an add/drop circulator 112, an add/drop PDM 114 and a mirror 116. It is understood that other components and modules may be added to the system 100 which are not shown or discussed in the figures.

Generally, in the preferred embodiment, a WDM input signal 106 is directed through the first optical train 102 whereby the WDM input signal 106 is directed to the modulator 120. In addition, a WDM add signal 118 passes through the second optical train 110 and is also directed to the modulator 120. Both signals 106, 118 are then reflected or diffracted by the modulator 120, based on the desired multiplexed signal, whereby the modulator sends the desired multiplexed signal back through the first optical train 102 where the multiplexed signal is sent out as a WDM output signal 108. In addition, the component signals that are to be dropped are sent back through the second optical train 110 whereby the component signals are dropped as a WDM dropped signal 119. Each component shown in FIG. 2 will now be described.

Figure 3:
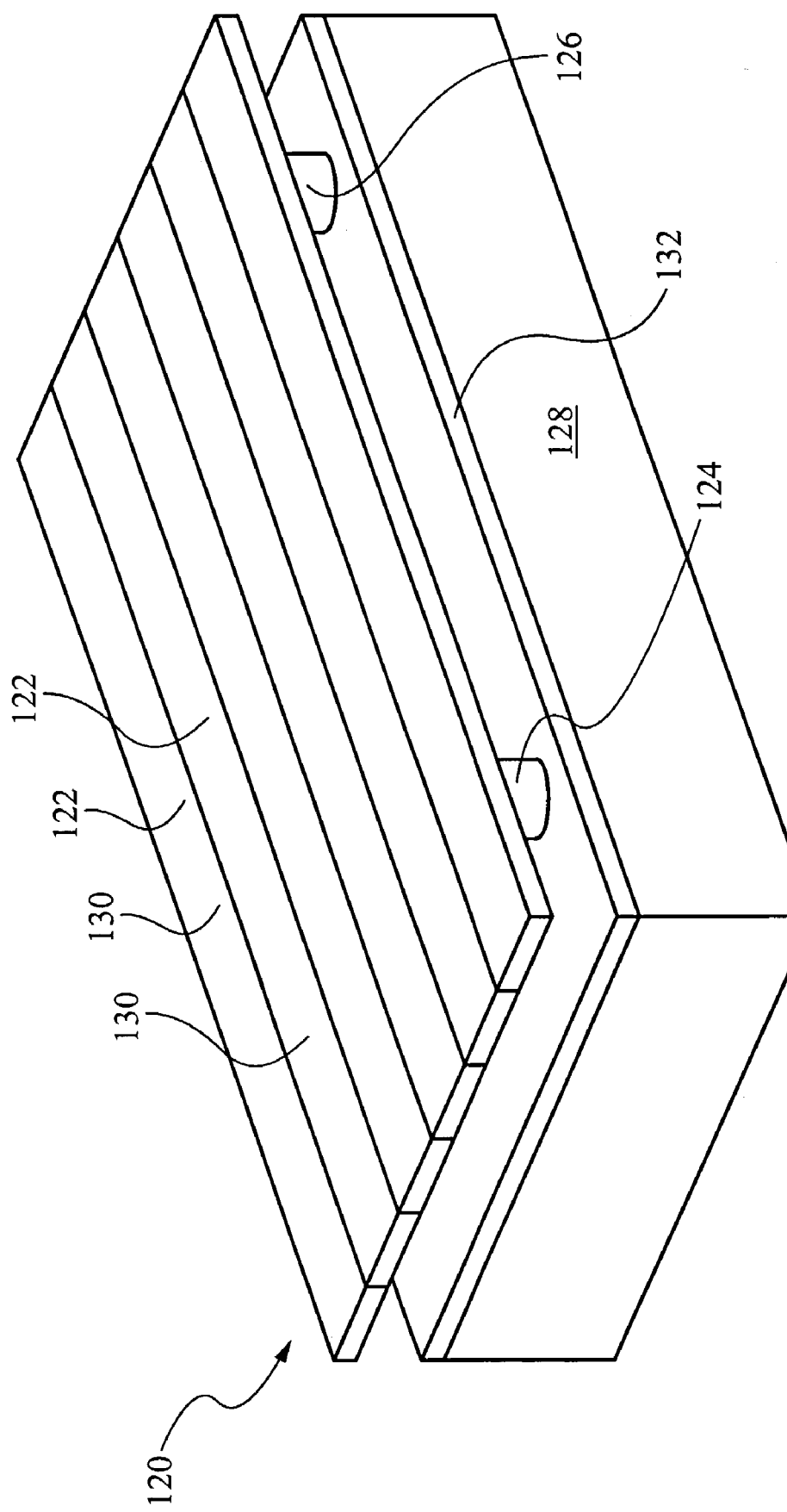
FIG. 3 illustrates a perspective view of a grating light valve according to the present invention.

The modulator 120 is preferably a grating light valve. FIG. 3 illustrates a perspective view of the grating light valve, hereinafter referred to as 120, according to the preferred embodiment of the present invention. The grating light valve 120 preferably comprises elongated elements 122 suspended by first and second posts, 124 and 126, above a substrate 128. The elongated elements 122 comprise a conducting and reflecting surface 130. The substrate 128 comprises a conductor 132. In operation, the grating light valve 120 operates to produce modulated light from a reflection mode and a diffraction mode.

It will be readily apparent to one skilled in the art that the conducting and reflecting surface 130 of the grating light valve 120 can be replaced by a multilayer dielectric reflector in which case a conducting element would also be included in each of the elongated elements 122. Further, it will be readily apparent to one skilled in the art that the conducting and reflecting surface 130 can be coated with a transparent layer such as an anti-reflective layer.

Figure 4:
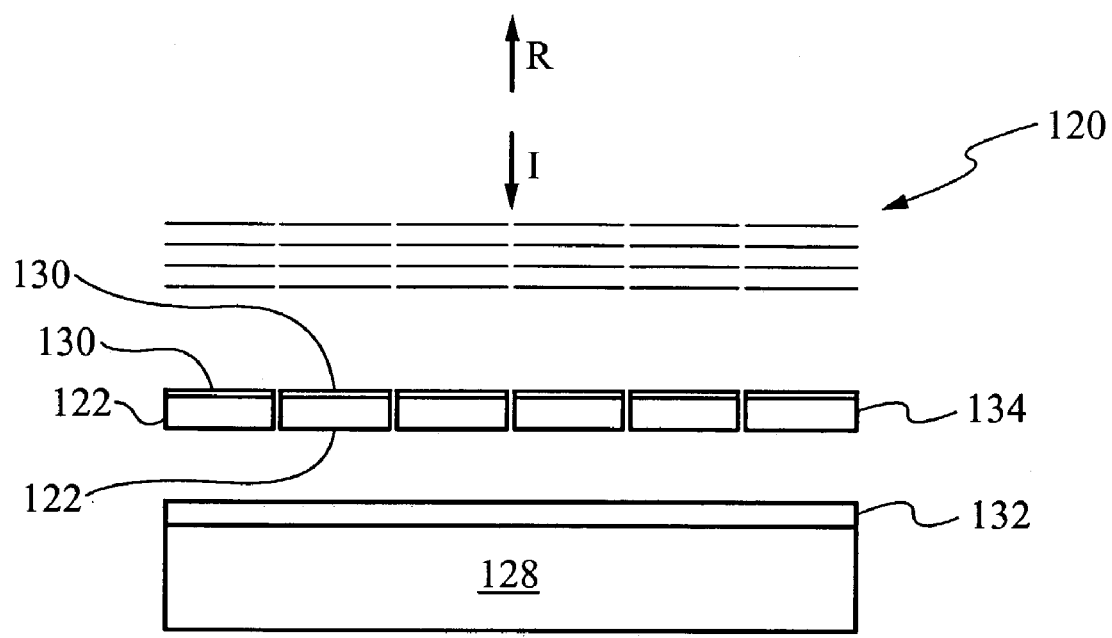
FIG. 4 illustrates a cross-section of the grating light valve in a non-actuated position.
Figure 5:
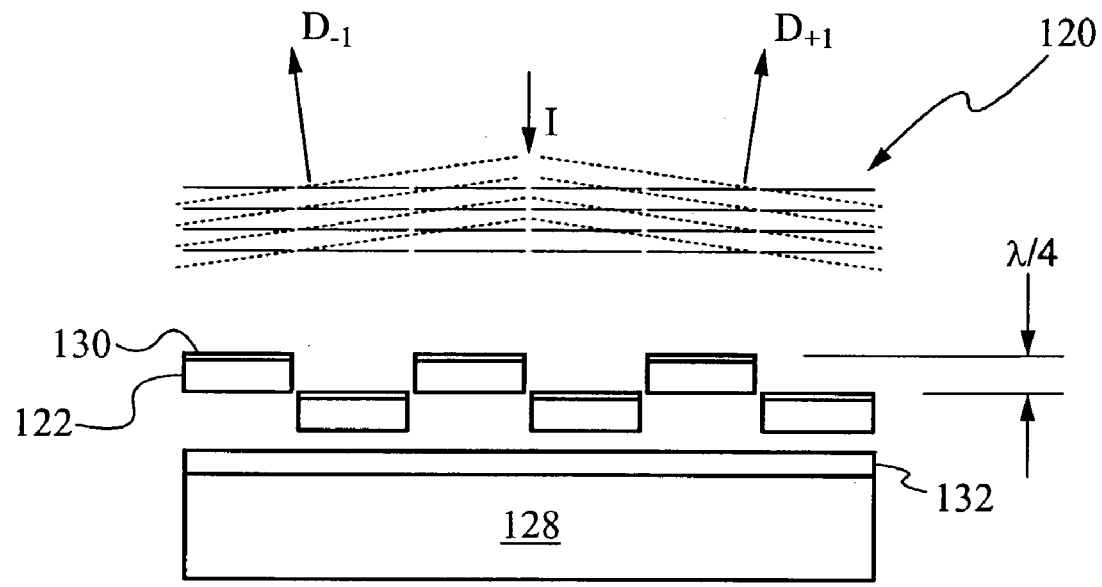
FIG. 5 illustrates a cross-section of the grating light valve in an actuated position.

A cross-section of the grating light valve 120 of the present invention is further illustrated in FIGS. 4 and 5. The grating light valve 120 comprises the elongated elements 122 suspended above the substrate 128. The elongated elements comprise the conducting and reflecting surface 130 and a resilient material 134. The substrate 128 comprises the conductor 132.

FIG. 4 illustrates a cross-section of the grating light valve 120 in a non-actuated position or reflection mode. In the reflection mode, the conducting and reflecting surfaces 130 of the grating light valve's 120 elongated elements 122 form a plane so that incident light I reflects from the elongated elements 122 to produce reflected light R.

FIG. 5 illustrates a cross-section of the grating light valve 120 in an actuated position or diffraction mode. In the diffraction mode, an applied electrical bias causes alternate ones of the elongated elements 122 to move toward the substrate 128. The electrical bias is applied between the reflecting and conducting surfaces 130 of the alternate ones of the elongated elements 122 and the conductor 132. The electrical bias results in a maximum height difference of a quarter wavelength $\lambda/4$ of the incident light I between the alternate ones of the elongated elements 122 and non-biased ones of the elongated elements 122. The height difference of the quarter wavelength $\lambda/4$ produces maximum diffracted light including a plus one ($D_{+1}$) diffraction order and a minus one ($D_{-1}$) diffraction order.

FIGS. 4 and 5 depict the grating light valve 120 in the reflection and diffraction modes, respectively. For a deflection of the alternate ones of the elongated elements 122 of less than a quarter wavelength $\lambda/4$, the incident light I both reflects and diffracts, thereby producing the reflected light R and the diffracted light including the plus one and minus one diffraction orders, $D_{+1}$ and $D_{-1}$. In other words, by deflecting the alternate ones of the elongated elements less the quarter wavelength $\lambda/4$, the grating light valve 120 produces a variable reflectivity.

While FIGS. 3, 4 and 5 depict the grating light valve 120 having six of the elongated elements 122, the grating light valve 120 preferably includes more than six of the elongated elements 122. By providing more of the elongated elements 122, the elongated elements 122 are able to function as groups, which are referred to as pixels. Preferably, each pixel is a group of six of the elongated elements 122. Alternatively, each pixel is a group of more or less elongated elements 122. Preferably, the grating light valve 120 includes 1,080 of the pixels. Alternatively, the grating light valve 120 includes more or less of the pixels. It will be readily apparent to one skilled in the art that the term "pixel" is used here in the context of an element of a light modulator rather than its more specific definition of a picture element of a display.

The grating light valve 120 is driven by an electronics circuit (not shown) which actuates the elongated elements 122 and thereby directs at least one of the WDM channels into the diffraction mode while directing a remainder of the WDM channels into the reflection mode. A controller (not shown) instructs the grating light valve 120 as to which component signals of the WDM signal are to be sent to the output 108 and which components are to be dropped 119. The controller (not shown) then causes the electronic circuit (not shown) to actuate the elongated elements 122 of the grating light valve 120 accordingly.

The input/output circulator 104, as shown in FIG. 2, receives and directs the WDM input signal 106 through the PDM 105. The input/output circulator 104 also outputs or passes the WDM output signal 108 out of the system 100. The PDM 105 collimates the WDM input signal 106 and separates the beam into two spatially distinct beams, each of which carries one polarization state. More details concerning the in/out PDM can be found in U.S. patent application Ser. No. 10/318,658, issued as U.S. Pat. No. 6,928,207, filed on Dec. 12, 2002 and entitled "APPARATUS FOR SELECTIVELY BLOCKING WDM CHANNELS", which is hereby incorporated by reference. A miniature half-wave plate converts one of the beams into the identical polarization state as the other beam. These two beams are then directed onto the diffraction grating 150. In addition, the WDM output signal 108 is directed from the diffraction grating 150 to the input/output circulator 104. The add/drop circulator 112 receives and directs the WDM add signal 118 through the add/drop PDM 114. The add/drop circulator 112 also drops the WDM drop signal 119 out of the system 100. The add/drop PDM 114 performs the same function as the in/out PDM and it directs the WDM add signal 118 onto the diffraction grating 150. The mirror 116 also directs the WDM drop signal 119 back to the add/drop circulator 112 via the add/drop PDM 114. The diffraction grating 150 disperses all the WDM signals entering the system 100 into a first range of angles and de-multiplexes the WDM signals into component signals or channels. To successfully de-multiplex the WDM signals, the diffraction grating 150 alternatively has a blazed configuration (not shown).

The transform lens 140 directs the component signals to impinge onto spatially distinct positions along the grating light valve 120. In addition, the transform lens 140 transforms the reflected or diffracted channels back to the diffraction grating. The diffraction grating 150 re-multiplexes the component signals or channels into new WDM signals and directs the new WDM signals to the input/output circulator 104 or the add/drop circulator 112, depending on whether the WDM signals are being passed or dropped. Please note that 0 or $1^{st}$ order signals are referred to a signal diffracted by a diffracting module, such as a grating light valve.

Figure 6:
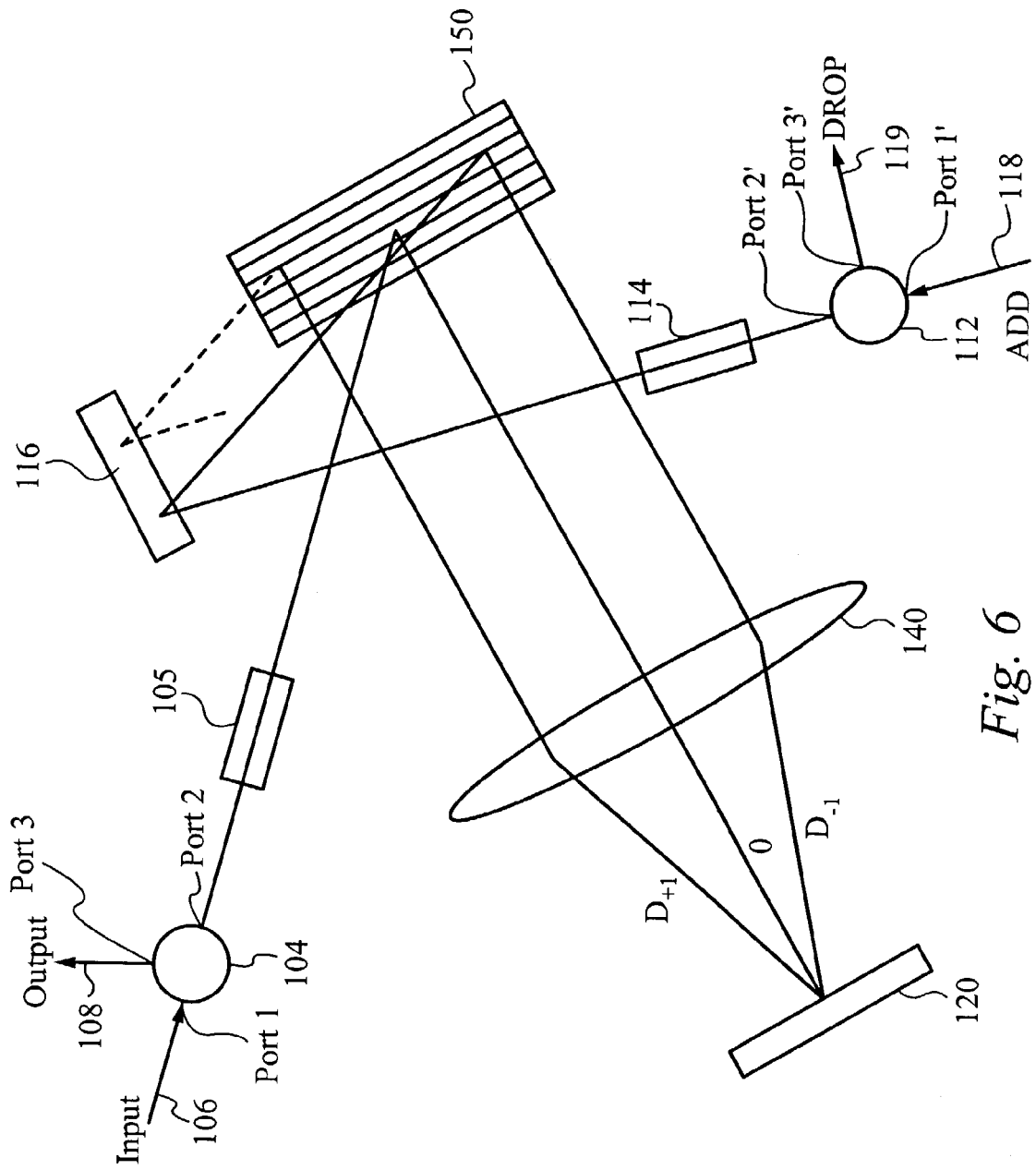
FIG. 6 illustrates an optical diagram of the OADM system according to the preferred embodiment of the present invention.

FIG. 6 illustrates a two-dimensional optical diagram of the optical add-drop multiplexer (OADM) system 100 according to the preferred embodiment of the present invention. The system 100 of the present invention preferably adds, passes and drops the WDM channels from the WDM signals. As illustrated in FIG. 6, a single component wavelength signal is shown, although a beam is coming out from each PDM 104, 114 the beams fall on each other and are shown as one beam. The remaining component signals are diffracted at different angles coming out of the page and are not shown. Similarly, the grating light valve 120 is shown to reflect or diffract the single component wavelength signal that is impinging on one of its elongated element 122. Thus, each elongated element 122 of the grating light valve 120 receives a corresponding one of the component wavelength signals. To reduce complexity, the single component wavelength signal is described, although it should be clear that the described principles and functionality apply equally to all component wavelength signals. It is preferred that the system 100 of the present invention be implemented in a free-space optics environment.

As stated above, the system 100 of the present invention preferably passes a WDM input signal 106 as an WDM output signal 108. As shown in FIG. 6, the WDM input signal 106 preferably enters the input/output circulator 104 through port 1. As stated above, the WDM input signal 106 is preferably a 0 order signal when entering the input/output circulator 104. Alternatively, the WDM input signal 106 is a higher order signal, as stated above, whereby the diffraction grating 150 has a blazed configuration. The WDM input signal 106 is then directed out of port 2 of the input/output circulator 104 to the diffraction grating 150 via the input/output PDM 105. The input/output PDM 105 collimates the WDM input signal 106 and directs the collimated WDM input signal 106 to the diffraction grating 150. The diffraction grating 150 then de-multiplexes the WDM input signal 106 into its component signal or WDM channel.

The component signal is directed from the diffraction grating 150 through the transform lens 140 to the grating light valve 120. Preferably, a single transform lens 140 is used for all component signals, although a separate transform lens 140 for each component signal can be used. The component signal that is directed through the transform lens then impinges on the grating light valve 120, which either reflects or diffracts the component signal in the manner previously described. If the component signal is to be passed on as part of the WDM output signal 108, the grating light valve 120 is placed in a non-actuated or reflective position (FIG. 4). The component signal thus impinges the reflecting surface 130 of a predetermined elongated element 122 of the grating light valve 120. The component signal then reflects along its angle of incidence I (FIG. 4) through the transform lens 140 back to the diffraction grating 150. The diffraction grating 150 then re-multiplexes the reflected component signal as well as other component signals designated to be part of the WDM output signal 108. From the diffraction grating 150, the WDM output signal 108 is directed back to port 2 of the input/output circulator 120 via the input/output PDM 105. The input/output circulator 104 then directs the WDM output signal out port 3 of the input/output circulator 104.

As stated above, the system 100 of the present invention also preferably adds a WDM add signal 118, whereby component signals of the WDM add signal 118 are either passed in the WDM output signal 108 or dropped in the WDM drop signal 119. Also shown in FIG. 6, an WDM add signal 118 preferably enters the add/drop circulator 112 through port 1'. The WDM add signal 118 is preferably a "0" order signal when entering the add/drop circulator 112. Alternatively, the WDM add signal 118 is a higher order signal, such as a $1^{st}$ order signal. As stated above, if the WDM add signal is alternatively a higher order signal, the diffraction grating alternatively has a blazed configuration.

The WDM add signal 118 is then directed out of port 2' of the add/drop circulator 112 to the mirror 116 via the add/drop PDM 114. The add/drop PDM 114 collimates the WDM add signal 118 and directs the collimated WDM add signal 118 to the mirror 116 which reflects the WDM add signal to the diffraction grating 150. The diffraction grating 150 then de-multiplexes the WDM add signal 106 into its component signals or WDM channels. The component signal to be added is preferably directed from the diffraction grating 150 through the transform lens 140 to the grating light valve 120 along optical paths $D_{+1}$ and $D_{-1}$. Alternatively, the component signal to be added is directed from the diffraction grating 150 through the transform lens 140 to the grating light valve 120 along optical paths $D_{+1}$ or $D_{-1}$.

The grating light valve 120 receives the component signal at a predetermined elongated element 122 which corresponds to the wavelength of the component signal to be added. Since the component signal to be added is preferably a $1^{st}$ order signal, an electrical bias is applied to the grating light valve 120, such that the elongated element 122 of the grating light valve 120 is placed in a diffractive position. Thus, the elongated element 122 of the grating light valve 120 is actuated such that the $1^{st}$ order component signal is diffracted off the grating light valve 120. The diffracted component signal is thus directed back along the "0" optical path through the transform lens 140 to the diffraction grating 150.

The diffraction grating 150 re-multiplexes the added component signal with any component signals of the WDM Input signal 106 that are reflected and thereby designated to be passed as part of the WDM output signal 108. The WDM output signal 108 is directed from the diffraction grating 150 to port 2 of the input/output circulator 104 via the input/output collimating PDM 105. The input/output circulator 104 directs the WDM output signal 108 out of its port 3 as the OUTPUT.

As stated above, the system 100 of the present invention preferably drops one or more component signals of either a WDM input signal 106 or a WDM add signal 118 as a WDM drop signal 119. To drop a component signal, the elongated element 122 of the grating light valve 120 which receives the component signal is placed in a position such that the component signal is eventually directed to the add/drop circulator 112. Thus, if the component signal is a "0" order signal, the grating light valve 120 places the elongated element 122 in an actuated position such that the component signal will be diffracted back to the diffraction grating 150 as a $1^{st}$ order signal. However, if the component signal is a "$1^{st}$" order signal, the grating light valve 120 places the elongated element 122 in a non-actuated position such that the component signal will be reflected back to the diffraction grating 150 as a $1^{st}$ order signal.

For a component signal that is part of a WDM input signal 106 which impinges on a predetermined elongated element 122, the elongated element 122 is electrically biased to be in an actuated or diffractive position (FIG. 5). As the component signal impinges the predetermined elongated element 122 that is in the diffractive position, the component signal is diffracted back to the diffraction grating 150 along the optical path $D_{+1}$ and $D_{-1}$. In other words, a "0" order component signal is diffracted back to the diffraction grating 150 as a $1^{st}$ order signal. The diffraction grating 150 then re-multiplexes the $1^{st}$ order component signal with other $1^{st}$ order component signals to form a WDM drop signal 119. From the diffraction grating 150, the WDM drop signal 119 is directed to the mirror 116 which directs the WDM drop signal 119 back to port '2 of the add/drop circulator 112 via the add/drop PDM 114. The add/drop circulator 112 then directs the WDM drop signal 119 out port 3' as a DROPPED signal.

For a component signal that is part of a WDM add signal 118 which impinges on a predetermined elongated element 122, the elongated element 122 is electrically biased to be in a non-actuated or reflective position (FIG. 4). As the component signal impinges the predetermined elongated element 122 that is in the reflective position, the component signal is reflected back to the diffraction grating 150 along the optical path $D_{+1}$ and $D_{-1}$. In other words, a "$1^{st}$" order component signal is reflected back to the diffraction grating 150 as a $1^{st}$ order signal. The diffraction grating 150 then re-multiplexes the $1^{st}$ order component signal with other $1^{st}$ order component signals to form a WDM drop signal 119. From the diffraction grating 150, the WDM drop signal 119 is directed to the mirror 116 which directs the WDM drop signal 119 back to port '2 of the add/drop circulator 112 via the add/drop PDM 114. The add/drop circulator 112 then directs the WDM drop signal 119 out port 3' as a DROPPED signal.

In this manner, each component signal is either passed or dropped by the OADM system 100. Depending on the position of the elongated element 122 of the grating light valve 120, the component signal is re-multiplexed and either directed towards the OUTPUT port 3 or the DROP port 3'. In addition, when component signals are dropped, new added component signals can be added to the same wavelength channels from where the dropped component signals were taken.

Figure 7:
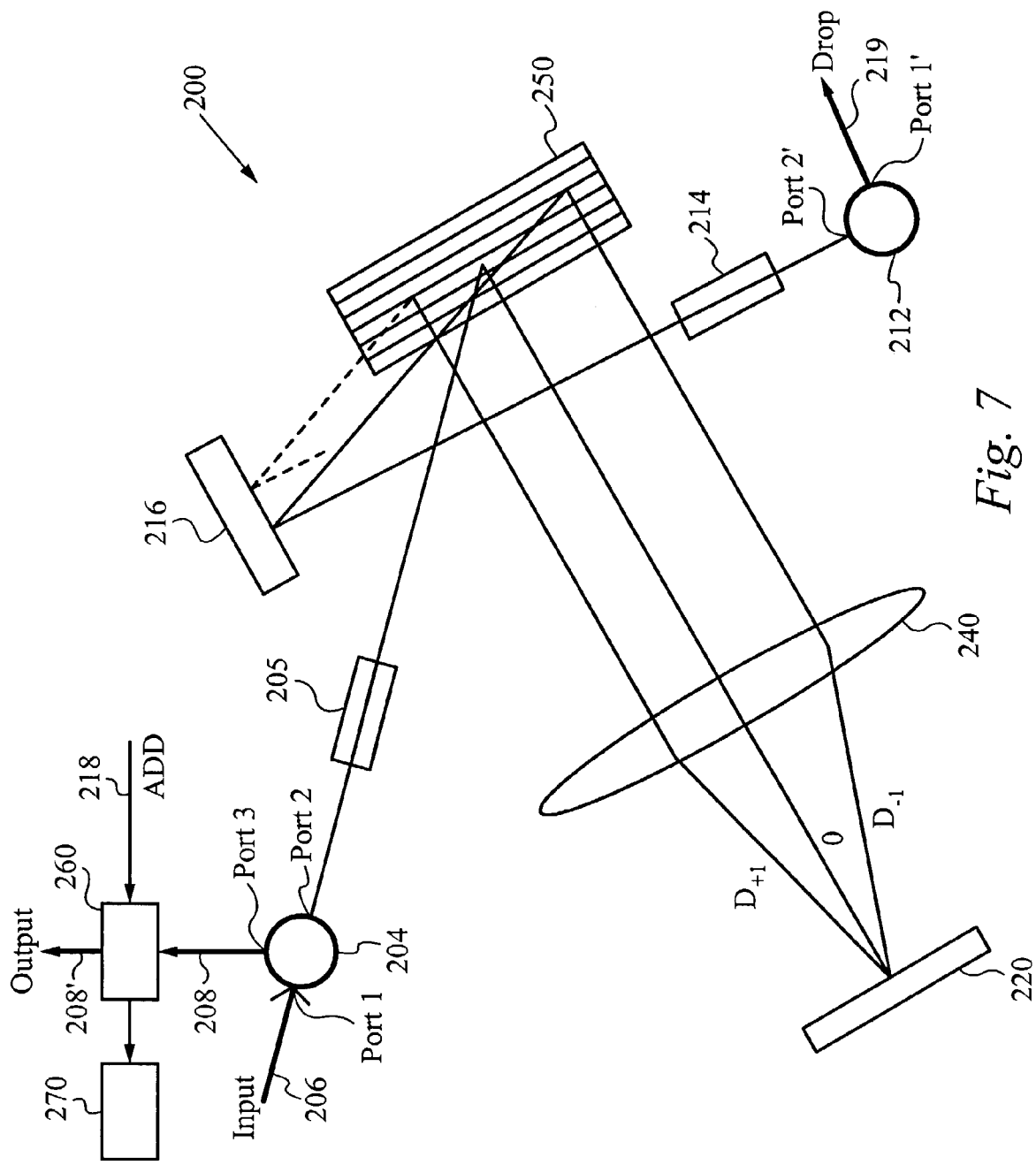
FIG. 7 illustrates an alternate embodiment of the OADM system according to the present invention.

FIG. 7 illustrates an optical diagram of an alternate embodiment of the OADM system 200 according to the present invention. The system 200 of the present invention preferably adds, passes and drops the WDM channels from the WDM signals. As illustrated in FIG. 7, only a single component wavelength signal is shown. The remaining component signals are diffracted at different angles coming out of the page and are not shown. Similarly, the grating light valve 220 is shown to reflect or diffract the single component wavelength signal that is impinging on one of its elongated element 122 (FIGS. 3, 4 and 5). Thus, each elongated element 122 of the grating light valve 220 receives a corresponding one of the component wavelength signals. To reduce complexity, the single component wavelength signal is described, although it should be clear that the described principles and functionality apply equally to all component wavelength signals. It is preferred that the system 200 of the present invention be implemented in a free-space optics environment.

As stated above, the system 100 of the present invention preferably passes a WDM input signal 206 as an WDM output signal 208. As shown in FIG. 7, the WDM input signal 206 preferably enters the input/output circulator 204 through port 1. As stated above, the WDM input signal 206 is preferably a "0" order signal when entering the input/output circulator 204. Alternatively, the WDM input signal 206 is a higher order signal, as stated above, whereby the diffraction grating 250 is a blazed diffraction grating has a blazed configuration. The WDM input signal 206 is then directed out of port 2 of the input/output circulator 204 to the diffraction grating 250 via the input/output PDM 205. The input/output PDM 205 collimates the WDM input signal 206 and directs the collimated WDM input signal 206 to the diffraction grating 250. The diffraction grating 250 then de-multiplexes the WDM input signal 206 into one or more component signals or WDM channels.

The component signal is directed from the diffraction grating 250 through the transform lens 240 to the grating light valve 220. Preferably, a single transform lens 240 is used for all component signals, although a separate transform lens 240 for each component signal can be used. The component signal that is directed through the transform lens then impinges on the grating light valve 220, which either reflects or diffracts the component signal in the manner previously described. If the component signal is to be passed on as part of the WDM output signal 208, the grating light valve 220 is placed in a non-actuated or reflective position (FIG. 4). The component signal thus impinges the reflecting surface 230 of a predetermined elongated element 222 of the grating light valve 220. The component signal then reflects along its angle of incidence I (FIG. 4) through the transform lens 240 back to the diffraction grating 250 along optical path "0". The diffraction grating 250 then re-multiplexes the reflected component signal as well as other component signals designated to be part of the WDM output signal 208. From the diffraction grating 250, the WDM output signal 208 is directed back to port 2 of the input/output circulator 220 via the input/output PDM 205. The input/output circulator 204 then directs the WDM output signal out port 3 of the input/output circulator 204.

As stated above, the system 200 of the present invention also preferably adds a WDM add signal 218, whereby component signals of the WDM add signal 218 are either passed in the WDM output signal 208 or dropped in the WDM drop signal 219. As shown in FIG. 7, an WDM add signal 218 is alternatively added to the WDM output signal 208 by a passive coupler module 260. The passive coupler module 260 applies the WDM add signal 218 to the WDM output signal 208 to form a final WDM output signal 208'. Alternatively, the passive coupler module 260 de-multiplexes the WDM add signal 218 into its respective add component signals and applies the desired add component signals to the dropped component signal positions in the WDM output signal 208 to form the final WDM output signal 208'. The passive coupler module 260 has a tailored coupling ratio and is thereby able to apply a single add component signal to the WDM output signal 208. The passive coupler module 260 alternatively uses dynamic provisioning capabilities to dynamically add any desired component signal to the WDM output signal 208 at any time.

As stated above in the preferred embodiment, the system 200 of the present invention preferably drops one or more component signals of either a WDM input signal 206 or a WDM add signal 218 as a WDM drop signal 219. To drop a component signal, the elongated element 122 (FIGS. 3, 4, and 5) of the grating light valve 220 which receives the component signal is placed in a position such that the component signal is eventually directed to the add/drop circulator 212. Thus, if the component signal is a "0" order signal, the grating light valve 220 places the elongated element 122 in an actuated position such that the component signal will be diffracted back to the diffraction grating 250 as a $1^{st}$ order signal. However, if the component signal is a "$1^{st}$" order signal, the grating light valve 220 places the elongated element 122 in a non-actuated position such that the component signal will be reflected back to the diffraction grating 250 as a $1^{st}$ order signal.

For a component signal that is part of a WDM input signal 206 which impinges on a predetermined elongated element 122, the elongated element 122 is electrically biased to be in an actuated or diffractive position (FIG. 5). As the component signal impinges the predetermined elongated element 122 that is in the diffractive position, the component signal is diffracted back to the diffraction grating 250 along the optical path $D_{+1}$ and $D_{-1}$. In other words, a "0" order component signal is diffracted back to the diffraction grating 250 as a $1^{st}$ order signal. The diffraction grating 250 then re-multiplexes the $1^{st}$ order component signal with other $1^{st}$ order component signals to form a WDM drop signal 219. From the diffraction grating 250, the WDM drop signal 119 is directed to the mirror 216 which directs the WDM drop signal 219 back to port 2' of the add/drop circulator 212 via the add/drop PDM 214. The add/drop circulator 212 then directs the WDM drop signal 219 out port 3' as a DROPPED signal.

For a component signal that will be added to the WDM output signal 208 via a passive coupler 260, the system 200 is instructed by the controller (not shown) as to which component signals must be dropped to accommodate the passive coupler 260. Thus, the system 200 will be notified by the controller (not shown) that the passive coupler 260 will add a component signal having a predetermined wavelength. The grating light valve 220 will thus be instructed to drop the component signal from the WDM input signal 206 that corresponds to the wavelength of the component signal that will be added by the passive coupler 260. Thus, the passive coupler 260 is able to add the component signal to the WDM output signal 208 at the specified wavelengths without overloading the bandwidth of the system 200.

As stated above, the system 200 drops a component signal which impinges on a predetermined elongated element 122, by placing the elongated element 122 in a position such that the component signal is directed to the diffraction grating 250 along the optical path $D_{+1}$ and $D_{-1}$. Alternatively, the elongated element 122 is placed in a position such that the component signal is directed to the diffraction grating 250 along the optical path $D_{+1}$ and $D_{-1}$. In other words, a "$1^{st}$" order component signal is reflected back to the diffraction grating 250 as a "$1^{st}$" order signal. In addition, a "0" order component signal is diffracted to the diffraction grating 250 as a "$1^{st}$" order signal. The diffraction grating 250 then re-multiplexes the $1^{st}$ order component signal with other $1^{st}$ order component signals to form a WDM drop signal 219. From the diffraction grating 250, the WDM drop signal 219 is directed to the mirror 216 which directs the WDM drop signal 219 back to port 2' of the add/drop circulator 212 via the add/drop PDM 214. The add/drop circulator 212 then directs the WDM drop signal 219 out port 1' as a DROPPED signal.

In this manner, each component wavelength signal is either passed or dropped by the OADM system 200. Depending on the position of the reflective layer of the grating light valve 220, the component signal is either directed towards the OUTPUT port 3 or the DROP port 1'. It will be readily apparent to one skilled in the art that other various modifications may be made to the preferred embodiment without departing from the spirit and scope of the invention as defined by the appended claims.

We claim:
1. An optical add and drop multiplexer system comprising:
   a. a first module for providing a first input signal and receiving a first output signal;
   b. a second module for providing a second input signal and receiving a second output signal;
   c. a fixed diffraction grating configured to produce a first set of component signals from the first input signal and a second set of component signals from the second input signal;
   d. a mirror configured to reflect the second input signal from the second module to the diffraction grating and to reflect component signals to be received by the second module from the diffraction grating to the second module; and
   e. a modulator using controllable diffraction for receiving the first and second sets of component signals, wherein corresponding component signals in the first and second sets are received at a same location on the modulator, each said location being configured to actuate between a first configuration and a second configuration,
   wherein each said location reflects a component signal of the first set to the first module and a corresponding component signal of the second set to the second module when a location is in the first configuration, and diffracts the component signal of the first set to the second module and the corresponding component signal of the second set to the first module when the location is in the second configuration, and
   further wherein one of the first and second configurations comprises a plurality of reflective surfaces being in a first plane, and another of the first and second configurations comprises every other one of the plurality of reflective surfaces being in the first plane and a remainder of the plurality of the reflective surfaces being in a second plane.

2. The system according to claim 1 wherein the first module comprises:
   a. a circulator configured to receive the first input signal at a first port, to transmit the first input signal from and receive the first output signal at a second port, to transmit the first output signal from a third port; and
   b. a polarization-diversity optical module (PDM) for directing the first input and output signals between the circulator and the diffraction grating.

3. The system according to claim 1 wherein the second module comprises:
   a. a circulator configured to receive the second input signal at a first port, to transmit the second input signal from and receive the second output signal at a second port, to transmit the second output signal from a third port;
   b. a polarization-diversity optical module (PDM) for directing the second input and output signals between the circulator and the diffraction grating.

4. The system according to claim 1 wherein the modulator is a grating light valve.

5. The system according to claim 1 further comprising a multiplexing module for dynamically equalizing the output signal, wherein the multiplexing module is coupled to the second module.

6. The system according to claim 1 wherein the fixed diffraction grating is a blazed diffraction grating.

7. An apparatus for modulating a first wavelength division multiplexed (WDM) signal with a second WDM signal, the apparatus comprising:
   a. a first module for providing the first WDM signal;
   b. a second module for providing the second WDM signal;
   c. a fixed diffraction grating configured to separate the first set of component signals of the first WDM signal and to separate a second set component signals of the second WDM signal; and
   d. a grating light valve array for receiving the first and second sets of component signals, wherein corresponding component signals of the first and second sets are received at a same grating light valve device of the array, each said grating light valve device being configurable into a first configuration and a second configuration,
   wherein each said grating light valve device reflects a component signal of the first set to the first module and a corresponding component signal of the second set to the second module when in the first configuration, and diffracts the component signal of the first set to the second module and the corresponding component signal of the second set to the first module when in the second configuration, and
   wherein one of the first and second configurations comprises a plurality of reflective surfaces being in a first plane, and another of the first and second configurations comprises alternate ones of the plurality of reflective surfaces being in the first plane and remaining ones of the plurality of reflective surfaces being in a second plane.

8. The apparatus according to claim 7 wherein the fixed diffraction grating is a blazed diffraction grating.

9. An apparatus for modulating a first signal and a second signal, the apparatus comprising:
   a. means for inputting the first signal, wherein the first signal includes a first group of component signals;
   b. means for inputting a second signal, wherein the second signal includes a second group of component signals;
   c. a fixed diffraction means configured to produce a first plurality of component signals from the first signal and a second plurality of component signals from the second signal; and
   d. means using controllable diffraction for modulating the first signal and second signal,
   wherein the means for modulating receives the first and second pluralities of component signals at a predetermined plurality of locations,
   further wherein the means for modulating selects a component signal from either the first plurality or the second plurality at each said location depending upon a device configuration,
   further wherein said device configuration is selected to be either a first or second configuration, the first configuration comprising a plurality of reflective surfaces lying in a first plane, and the second configuration comprising the plurality of reflective surfaces being either in the first plane and in a second plane in an alternating manner.

* * * * *